US011175072B2

(12) United States Patent
Tanaka

(10) Patent No.: US 11,175,072 B2
(45) Date of Patent: Nov. 16, 2021

(54) AIR CONDITIONER

(71) Applicant: Mitsubishi Electric Corporation, Tokyo (JP)

(72) Inventor: Kosuke Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 524 days.

(21) Appl. No.: 16/078,822

(22) PCT Filed: Mar. 23, 2016

(86) PCT No.: PCT/JP2016/059205
§ 371 (c)(1),
(2) Date: Aug. 22, 2018

(87) PCT Pub. No.: WO2017/163339
PCT Pub. Date: Sep. 28, 2017

(65) Prior Publication Data
US 2019/0049155 A1    Feb. 14, 2019

(51) Int. Cl.
*F25B 49/02*     (2006.01)
*F25B 9/00*      (2006.01)
(Continued)

(52) U.S. Cl.
CPC .............. *F25B 9/002* (2013.01); *C09K 5/04* (2013.01); *C09K 5/041* (2013.01); *C09K 5/045* (2013.01);
(Continued)

(58) Field of Classification Search
CPC .......... F25B 2400/13; F25B 2600/2509; F25B 13/00; F25B 49/022; F24F 11/30
(Continued)

(56) References Cited

U.S. PATENT DOCUMENTS 933,682 A * 9/1909 Voorhees ............... F25B 41/00
                                                      62/219
4,643,002 A * 2/1987 Dennis .................. F25B 41/20
                                                      62/525
(Continued)

FOREIGN PATENT DOCUMENTS

JP   08-054161 A   2/1996
JP   08-254363 A   10/1996
JP   11-159895 A   6/1999

OTHER PUBLICATIONS

International Search Report dated Jun. 14, 2016 issued in corresponding international patent application No. PCT/JP2016/059205.

*Primary Examiner* — Larry L Furdge
*Assistant Examiner* — Alexis K Cox
(74) *Attorney, Agent, or Firm* — Posz Law Group, PLC

(57) ABSTRACT

A notifier notifies a user of a warning when a ratio of first refrigerant is different from a suitable value, the ratio being determined from a first difference between a first temperature and a second temperature and from a second difference between a third temperature and a fourth temperature. The first temperature is a temperature of a non-azeotropic refrigerant mixture between a first heat exchanger and a second heat exchanger. The second temperature is a temperature of the non-azeotropic refrigerant mixture between the second heat exchanger and a first expansion valve. The third temperature is a temperature of the non-azeotropic refrigerant mixture between a first decompressor and a first connecting (Continued)

point. The fourth temperature is a temperature of the non-azeotropic refrigerant mixture between a second decompressor and the first connecting point.

11 Claims, 16 Drawing Sheets

(51) Int. Cl.
*C09K 5/04* (2006.01)
*F25B 41/37* (2021.01)
*F25B 13/00* (2006.01)
*F24F 11/30* (2018.01)
*F25B 1/00* (2006.01)

(52) U.S. Cl.
CPC .............. *F24F 11/30* (2018.01); *F25B 1/005* (2013.01); *F25B 13/00* (2013.01); *F25B 41/37* (2021.01); *F25B 49/022* (2013.01); *C09K 2205/126* (2013.01); *C09K 2205/34* (2013.01); *F25B 2400/0405* (2013.01); *F25B 2400/13* (2013.01); *F25B 2600/025* (2013.01); *F25B 2600/2501* (2013.01); *F25B 2600/2509* (2013.01); *F25B 2700/2101* (2013.01); *F25B 2700/2103* (2013.01); *F25B 2700/21174* (2013.01); *F25B 2700/21175* (2013.01)

(58) Field of Classification Search
USPC .................................................. 165/280–284
See application file for complete search history.

(56) References Cited

U.S. PATENT DOCUMENTS

| | | | | |
|---|---|---|---|---|
| 4,947,655 A * | 8/1990 | Shaw | ............................ | F25B 5/02 62/200 |
| 5,095,712 A * | 3/1992 | Narreau | ..................... | F25B 1/10 62/113 |
| 5,228,301 A * | 7/1993 | Sjoholm | .................. | F25B 41/20 62/84 |
| 5,709,094 A * | 1/1998 | Ooyabu | ............... | F24F 11/0009 62/126 |
| 5,711,163 A * | 1/1998 | Uchikawa | ................ | F24F 3/065 62/160 |
| 6,581,397 B1 * | 6/2003 | Taira | ........................ | F25B 9/002 62/199 |
| 6,817,205 B1 * | 11/2004 | Lifson | ...................... | F25B 13/00 62/117 |
| 7,024,879 B2 * | 4/2006 | Nakatani | .................. | F25B 9/008 62/324.1 |
| 2004/0093880 A1 * | 5/2004 | Zheng | .................. | B60H 1/3214 62/199 |
| 2004/0144111 A1 * | 7/2004 | Matsuoka | ............... | F25B 13/00 62/224 |
| 2004/0261447 A1 * | 12/2004 | Matsuoka | ............... | F25B 13/00 62/498 |
| 2005/0086969 A1 * | 4/2005 | Lifson | ..................... | F25B 41/40 62/324.1 |
| 2005/0086970 A1 * | 4/2005 | Lifson | ..................... | F25B 41/26 62/324.1 |
| 2020/0072518 A1 * | 3/2020 | Kumakura | ............... | F25B 9/006 |

* cited by examiner

<FIRST EMBODIMENT>

FIG.10
(a)
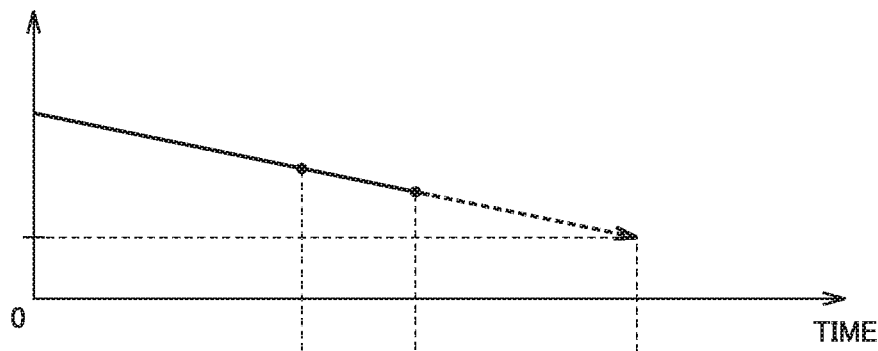
RATIO OF LOW BOILING TEMPERATURE REFRIGERANT (%)
(b)
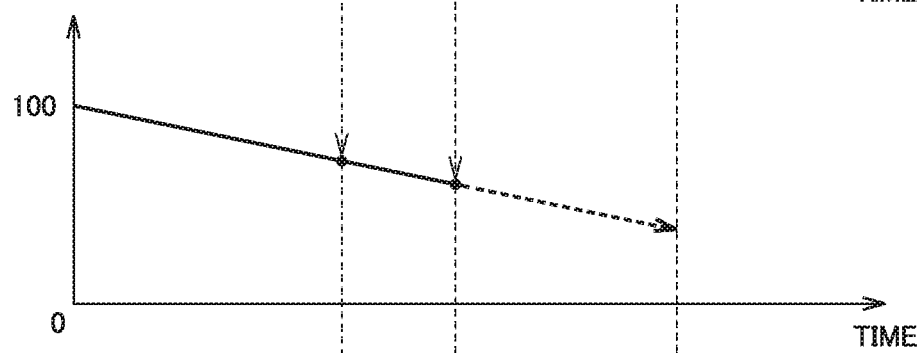
AMOUNT OF REFRIGERANT (%)
(c)
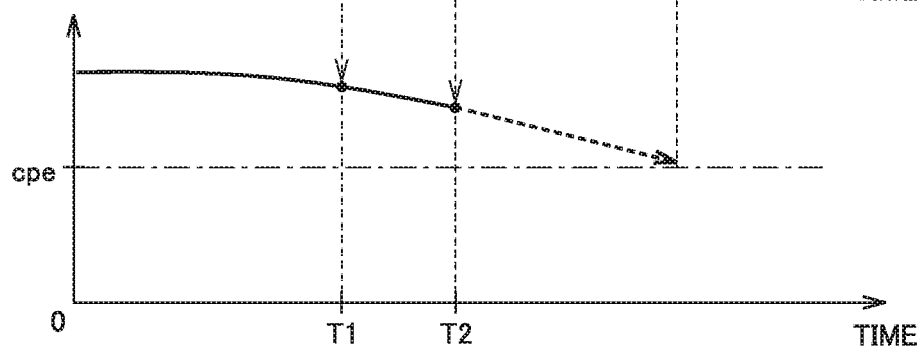
COP

<MODIFICATION OF FIRST EMBODIMENT>

<SECOND EMBODIMENT (COOLING)>

<SECOND EMBODIMENT (HEATING)>

AIR CONDITIONER

CROSS REFERENCE TO RELATED APPLICATION

This application is a U.S. national stage application of PCT/JP2016/059205 filed on Mar. 23, 2016, the contents of which are incorporated herein by reference.

TECHNICAL FIELD

The present invention relates to an air conditioner, and more particularly to an air conditioner using non-azeotropic refrigerant mixture.

BACKGROUND ART

In recent years, from the viewpoint of prevention of global warming, in air conditioners, a refrigerant mixture is used which is composed of refrigerant composed of a single component with another refrigerant having a lower global warming potential (GWP) mixed therewith to have a smaller GWP.

For example, Japanese Patent Laying-Open No. 08-054161 (PTD 1) discloses a refrigeration apparatus having a refrigerant circuit using non-azeotropic refrigerant mixture including refrigerants having different boiling temperatures, that has a configuration to detect leakage of the refrigerant by detecting a state of the refrigerant in the refrigerant circuit when the refrigeration apparatus is stopped from operating.

CITATION LIST

Patent Document

PTD 1: Japanese Patent Laying-Open No. 08-054161

SUMMARY OF INVENTION

Technical Problem

Refrigerant used in an air conditioner may leak from a connecting point of pipes for example. In non-azeotropic refrigerant mixture containing a plurality of types of refrigerants, a refrigerant contained in the non-azeotropic refrigerant mixture that has a low boiling temperature (hereinafter also referred to as a "low boiling temperature refrigerant") volatilizes and hence leaks more easily. Accordingly, the non-azeotropic refrigerant mixture is introduced into the air conditioner, and thereafter, as time elapses, the non-azeotropic refrigerant mixture's composition ratio may change.

When the non-azeotropic refrigerant mixture's composition changes, the non-azeotropic refrigerant mixture's characteristics may change. For this reason, for example, it may be difficult to continue to control a degree of superheat optimally. If the air conditioner is continuously operated in such a condition the air conditioner cannot keep a sufficient air conditioning capacity and the possibility that the air conditioner may fail also increases. Accordingly, it is necessary to detect a change in the composition ratio of the non-azeotropic refrigerant mixture.

For example, Japanese Patent Laying-Open No. 08-054161 (PTD 1) discloses a configuration utilizing the fact that the temperature and pressure in a refrigerant circuit and the amount of refrigerant leaking from the refrigerant circuit have a predetermined relationship to detect leakage of the refrigerant from temperature and pressure measured.

However, measuring the pressure requires a pressure sensor, which is larger in size and more expensive than a temperature sensor in many cases. Adopting the configuration disclosed in Japanese Patent Laying-Open No. 08-054161 (PTD 1) for detecting a change in the composition ratio of the non-azeotropic refrigerant mixture requires a pressure sensor, and it may be difficult to suppress a cost for manufacturing the air conditioner.

The present invention has been made to solve the above problem, and an object of thereof is to provide an air conditioner capable of detecting a change in the composition ratio of non-azeotropic refrigerant mixture while suppressing its manufacturing cost.

Solution to Problem

According to the present invention, an air conditioner is configured to circulate non-azeotropic refrigerant mixture including first refrigerant and second refrigerant in a first circulation direction of an order of a compressor, a first heat exchanger, a second heat exchanger, a first expansion valve, and a third heat exchanger, a boiling temperature of the second refrigerant being higher than a boiling temperature of the first refrigerant. The air conditioner comprises a first bypass path, a second bypass path and a notifier. The first bypass path branches from a first flow path connecting the second heat exchanger with the first expansion valve, and is connected to a second flow path connected to an inlet of the compressor via a first decompressor and the second heat exchanger in this order. The second bypass path branches from a third flow path connecting the first heat exchanger with the second heat exchanger, and is connected via a second decompressor to a first connecting point between the first decompressor and the second heat exchanger on the first bypass path. The notifier is configured to notify a user of a warning when a ratio of the first refrigerant is different from a suitable value, the ratio being determined from a first difference between a first temperature and a second temperature and from a second difference between a third temperature and a fourth temperature. The first temperature is a temperature of the non-azeotropic refrigerant mixture between the first heat exchanger and the second heat exchanger. The second temperature is a temperature of the non-azeotropic refrigerant mixture between the second heat exchanger and the first expansion valve. The third temperature is a temperature of the non-azeotropic refrigerant mixture between the first decompressor and the first connecting point. The fourth temperature is a temperature of the non-azeotropic refrigerant mixture between the second decompressor and the first connecting point.

Advantageous Effects of Invention

The air conditioner of the present invention allows a temperature difference to be used to determine the ratio of a low boiling temperature refrigerant and thus dispenses with a pressure sensor in determining the ratio. As a result, the air conditioner allows a change in the composition ratio of the non-azeotropic refrigerant mixture to be detected while suppressing its manufacturing cost.

BRIEF DESCRIPTION OF DRAWINGS

FIGS. 10(a), 10(b) and 10(c) show a decrease of the ratio of the low boiling temperature refrigerant, a decrease of the amount of the non-azeotropic refrigerant mixture, and a decrease of a coefficient of performance (COP), respectively, as time elapses.

DESCRIPTION OF EMBODIMENTS

Hereinafter, embodiments of the present invention will specifically be described with reference to the drawings. In the figures, identical or corresponding, components are identically denoted and will not be described redundantly.

First Embodiment

Figure 1:
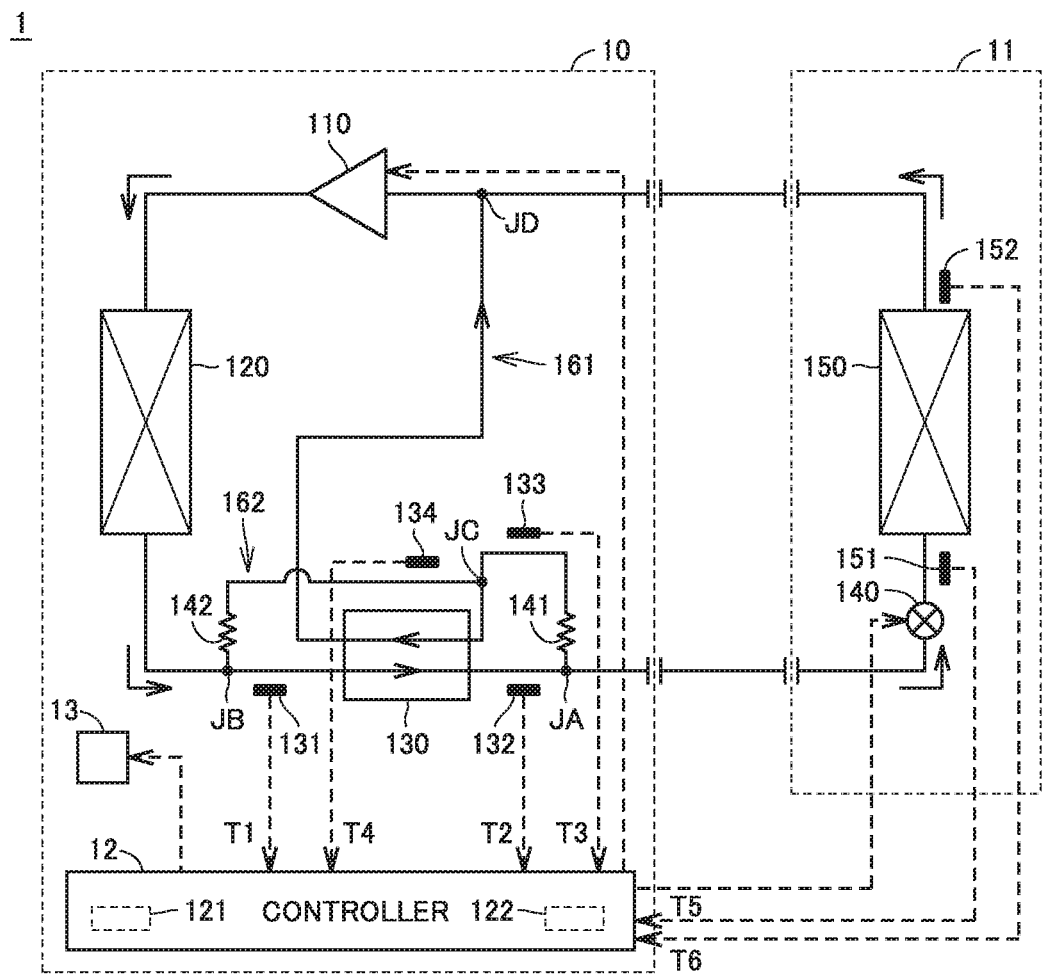
FIG. 1 is a functional block diagram showing a configuration of an air conditioner according to an embodiment.

FIG. 1 is a functional block diagram showing a configuration of an air conditioner 1 according to a first embodiment. As shown in FIG. 1, air conditioner 1 includes an outdoor unit 10 and an indoor unit 11.

Outdoor unit 10 includes a compressor 110, a first heat exchanger 120, a second heat exchanger 130, a first bypass path 161, a capillary 141, a second bypass path 162, a capillary 142, a controller 12, and a notifier 13. Indoor unit 11 includes an expansion valve 140 and a third heat exchanger 150. Controller 12 may be included in indoor unit 11 or may not be included in any of outdoor unit 10 and indoor unit 11.

In air conditioner 1, refrigerant circulates in the order of compressor 110, first heat exchanger 120, second heat exchanger 130, expansion valve 140, and third heat exchanger 150. First heat exchanger 120 functions as a condenser. Second heat exchanger 130 connected between first heat exchanger 120 and expansion valve 140 cools refrigerant of liquid (liquid refrigerant) received from first heat exchanger 120. Third heat exchanger 150 receives the liquid refrigerant from second heat exchanger 130 and functions as an evaporator. Air conditioner 1 performs cooling by absorbing heat from indoor air by third heat exchanger 150.

Compressor 110 has a driving frequency f controlled by controller 12 and is thus controlled in capacity (i.e., an amount of refrigerant discharged per unit time). Compressor 110 receives refrigerant of gas (i.e., gaseous refrigerant) from third heat exchanger 150, compresses it, and outputs it.

In first heat exchanger 120, the gaseous refrigerant discharged from compressor 110 is condensed and liquid refrigerant is output. First heat exchanger 120 radiates heat outdoor when the gaseous refrigerant condenses (i.e., heat of condensation).

First bypass path 161 branches from a connecting point JA between second heat exchanger 130 and expansion valve 140. First bypass path 161 is connected via capillary 141 and second heat exchanger 130 in this order to a flow path connected to the inlet of compressor 110, that is, a flow path connecting third heat exchanger 150 and compressor 110.

The liquid refrigerant from connecting point JA is adiabatically decompressed by capillary 141 and thus partially boiled at low temperature. The refrigerant from capillary 141 is gas-liquid two-phase refrigerant (i.e., wet steam).

Second heat exchanger 130 allows heat of the liquid refrigerant from first heat exchanger 120 to be absorbed by the wet steam received from capillary 141 to increase the liquid refrigerant's degree of supercooling. Inside second heat exchanger 130, a pipe through which the liquid refrigerant from first heat exchanger 120 flows and a pipe through which the wet steam from the capillary flows are disposed substantially in parallel and to also allow the flow of the liquid refrigerant from the first heat exchanger 120 to be opposite in direction to the flow of the wet steam from the capillary. That is, the two pipes are disposed to allow the flow of the liquid refrigerant from the first heat exchanger 120 and the flow of the wet steam from the capillary to be opposite flows. Second heat exchanger 130 is, for example, a double pipe type heat exchanger. Second heat exchanger 130 corresponds to a third heat exchanger of the present invention.

Expansion valve 140 adiabatically expands and thus decompresses the liquid refrigerant received from second heat exchanger 130. Expansion valve 140 has an opening degree adjusted by controller 12. From expansion valve 140, wet steam is output. Expansion valve 140 is, for example, a linear expansion valve (LEV).

Third heat exchanger 150 evaporates the liquid refrigerant contained in the wet steam received from expansion valve 140. Gaseous refrigerant is output from third heat exchanger 150. In third heat exchanger 150, the liquid refrigerant deprives indoor air of heat and thus evaporates (i.e., heat of evaporation).

Second bypass path 162 branches from a connecting point JB between first heat exchanger 120 and second heat exchanger 130. Second bypass path 162 is connected via capillary 142 to a connecting point JC between capillary 141 and second heat exchanger 130.

The liquid refrigerant from connecting point JB is adiabatically decompressed by capillary 142 and thus partially boiled at low temperature. The refrigerant from capillary 142 is wet steam and joins the wet steam from capillary 141 at connecting point JC.

The refrigerant from connecting point JC joins the refrigerant from third heat exchanger 150 at a connecting point JD between third heat exchanger 150 and compressor 110 and is sucked into compressor 110.

A temperature sensor 131 measures a temperature T1 of the refrigerant flowing between connecting point JB and second heat exchanger 130. A temperature sensor 132 measures a temperature T2 of the refrigerant flowing between second heat exchanger 130 and connecting point JA. A temperature sensor 133 measures a temperature T3 of the refrigerant flowing between capillary 141 and connecting point JC. A temperature sensor 134 measures a temperature T4 of the refrigerant flowing between capillary 142 and connecting point JC. A temperature sensor 151 measures a temperature T5 of the refrigerant flowing between expansion valve 140 and third heat exchanger 150. A temperature sensor 152 measures a temperature T6 of the refrigerant flowing between third heat exchanger 150 and compressor 110. Temperature sensors 131 to 134, 151 and 152 are, for example, thermistors.

Controller 12 includes a control unit 121 and a storage unit 122. Control unit 121 has a computer such as a CPU (central processing unit), for example. Storage unit 122 has a nonvolatile memory such as a flash memory. Storage unit 122 can store, for example, an OS (operating system) read and executed by control unit 121, a program of various applications (for example, a program for controlling a degree of superheat), and various data used by the program (e.g., data of the refrigerant's characteristics, such as an isothermal line, a saturated liquid line and a saturated vapor line).

Controller 12 receives signals from temperature sensors 131 to 134, 151 and 152, respectively, and sets a target degree of superheat for the refrigerant output from first heat exchanger 120. Controller 12 adjusts the degree of opening of expansion valve 140 to allow the degree of superheat of the refrigerant flowing between first heat exchanger 120 and compressor 110 to approach the target degree of superheat (i.e., controls a degree of superheat).

Notifier 13 sends the user a notification regarding a warning including the contents indicated by controller 12. The contents of the notification are, for example, that the refrigerant is leaking, that the refrigerant has been erroneously introduced, or that a time for maintenance has arrived. Notifier 13 includes, for example, a speaker capable of outputting a message, a monitor capable of displaying a message, a lamp, and a communication device capable of transmitting a message.

Refrigerant used in air conditioner 1, for example, includes non-azeotropic refrigerant mixture containing R32 as a low boiling temperature refrigerant and R1234yf as another refrigerant. The non-azeotropic refrigerant mixture used in air conditioner 1 may include R1123 or R1234ze to provide a reduced GWP value. The non-azeotropic refrigerant mixture used in air conditioner 1 may contain three or more types of refrigerants. Hereinafter, an example with the low boiling temperature refrigerant being R32 will be described.

Figure 2:
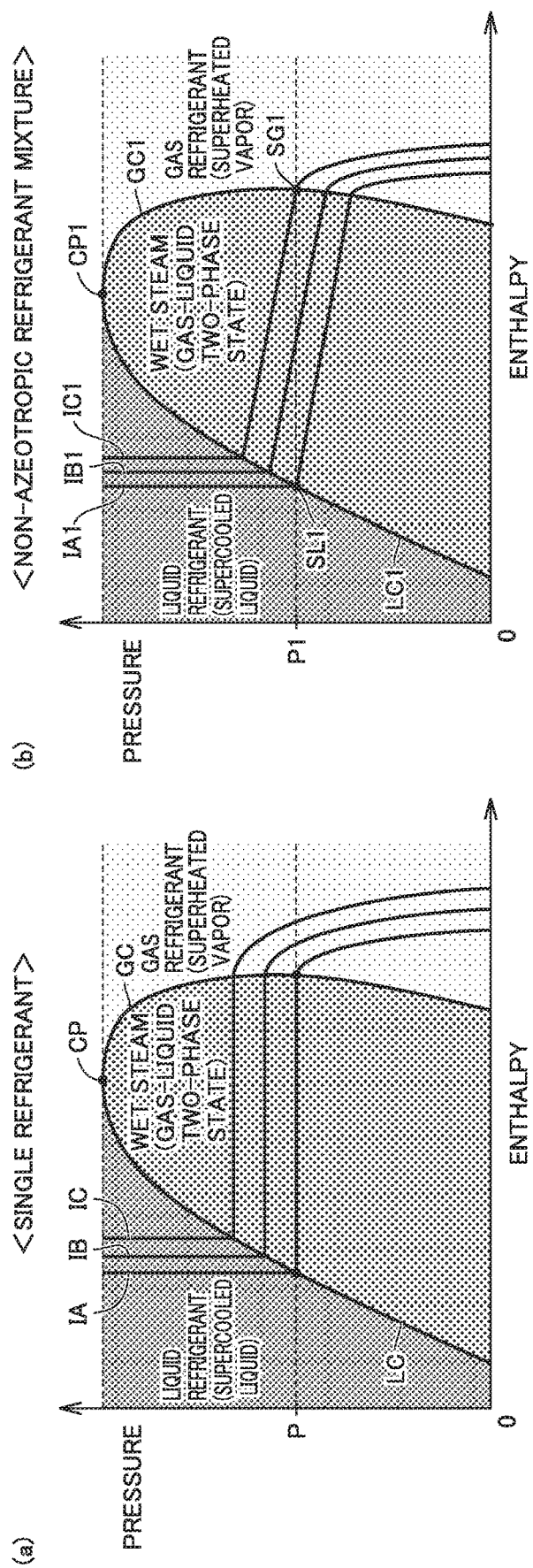
FIG. 2 diagrams showing a pressure-enthalpy relationship of a single refrigerant and a pressure-enthalpy relationship of non-azeotropic refrigerant mixture.

FIG. 2 is a single refrigerant's P-h diagram (a) and non-azeotropic refrigerant mixture's P-h diagram (b). In FIG. 2(a), a curve LC represents the single refrigerant's saturated liquid line, A curve GC represents the single refrigerant's saturated vapor line. A point CP represents the single refrigerant's critical point. Curves IA, IB, IC represent isothermal lines for temperatures TA, TB, TC (TA<TB<TC), respectively. In FIG. 2(b), a curve LC1 represents the non-azeotropic refrigerant mixture's saturated liquid line. A curve GC1 represents the non-azeotropic refrigerant mixture's saturated vapor line. A point CP1 represents the non-azeotropic refrigerant mixture's critical point. Curves IA1, IB1, IC1 represent isothermal lines for temperatures TA, TB, TC, respectively.

A critical point is a point indicating the limit of a range in which a phase change can occur between liquid refrigerant and gaseous refrigerant, and it is a point where a saturated liquid line and a saturated vapor line meet. When the pressure of the refrigerant becomes higher than the pressure at the critical point, no phase change will occur any longer between the liquid refrigerant and the gaseous refrigerant. In the region with an enthalpy lower than the saturated liquid line, the refrigerant is a liquid. In the region sandwiched between the saturated liquid line and the saturated vapor line, the refrigerant is in a gas-liquid, two-phase state (i.e., is wet steam). In the region with an enthalpy higher than the saturated vapor line, the refrigerant is a gas.

As shown in FIG. 2(a), it is known that the single refrigerant in the wet steam region presents isothermal lines without a substantial change in pressure as the enthalpy changes. That is, when the single refrigerant is substantially fixed in pressure, the single refrigerant in the form of wet steam substantially does not change in temperature as the enthalpy changes.

In contrast, as shown in FIG. 2(b), the non-azeotropic refrigerant mixture in the wet steam region presents isothermal lines with pressure decreasing as the enthalpy increases. In FIG. 2(b), a dotted line, which represents a pressure P1, intersects isothermal lines IA1 (temperature TA), IB1 (temperature TB), IC1 (temperature TC) successively as the enthalpy increases. With TA<TB<TC, when the non-azeotropic refrigerant mixture is substantially fixed in pressure, the temperature of the non-azeotropic refrigerant in the form of wet steam increases as the enthalpy increases. In the following, in a P-h diagram, a temperature difference between a point on the saturated liquid line and a point on the saturated vapor line for the same pressure will be referred to as a temperature gradient. In FIG. 2(b), for example, a temperature difference between a point SL1 on saturated liquid line LC1 and a point SG1 on saturated vapor line GC1 is a temperature gradient.

The refrigerant used in air conditioner 1 may leak from, for example, a connecting portion of a pipe. In non-azeotropic refrigerant mixture containing a plurality of types of refrigerants, a low boiling temperature refrigerant thereof more easily evaporates, and hence leaks more easily than the other refrigerants composing the non-azeotropic refrigerant. Accordingly, the non-azeotropic refrigerant mixture is introduced into air conditioner 1, and thereafter, as time elapses, the non-azeotropic refrigerant mixture's composition ratio may change.

Figure 3:
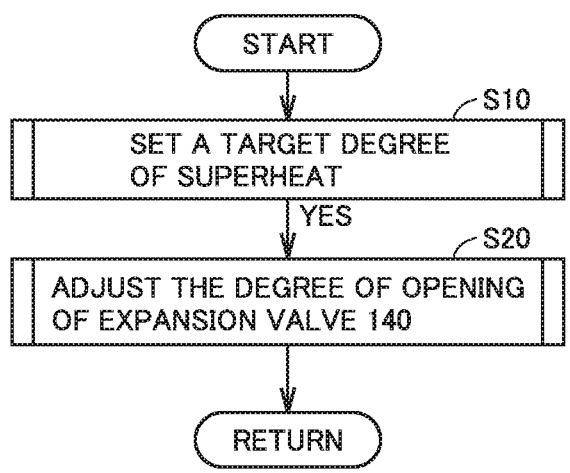
FIG. 3 is a flowchart for illustrating a process of controlling a degree of superheat.

FIG. 3 is a flowchart for illustrating a process performed by controller 12 for controlling a degree of superheat. As shown in FIG. 3, controller 12 in a step (hereinafter simply referred to as S) 10 receives temperatures T5, T6 from temperature sensors 151, 152, respectively, sets a target degree of superheat for the non-azeotropic refrigerant mixture output from third heat exchanger 150, and proceeds to step S20. In step S20, controller 12 adjusts the degree of opening of expansion valve 140 so that the degree of superheat of the non-azeotropic refrigerant mixture at the time when the evaporation process ends approaches the target degree of superheat, and controller 12 ends the process of controlling a degree of superheat.

When the non-azeotropic refrigerant mixture's composition ratio changes, its characteristics such as a temperature gradient change. Accordingly, for example, an optimum degree of superheat for the non-azeotropic refrigerant mixture at the time when the evaporation process ends would be changed, and continuing to control a degree of superheat to be the optimum degree of superheat may be difficult unless the target degree of superheat is reset. Hair conditioner 1 is continuously operated in such a condition air conditioner 1 cannot keep a sufficient air conditioning capacity and the possibility that air conditioner 1 may fail also increases. Accordingly, when the composition ratio of the non-azeotropic refrigerant mixture introduced in air conditioner 1 has changed, it is necessary to reset the target degree of superheat.

A known method for detecting a change in the composition ratio of non-azeotropic refrigerant mixture is, for example, a method in which the non-azeotropic refrigerant mixture's temperature and pressure are measured, and a relationship among the temperature, the pressure, and an amount of leakage of a low boiling temperature refrigerant is used to calculate leakage of the low boiling temperature refrigerant.

However, measuring the pressure requires a pressure sensor, which is larger in size and more expensive than a temperature sensor in many cases. The above method requires a pressure sensor, and it may be difficult to suppress a cost for manufacturing air conditioner 1.

Accordingly, in the first embodiment, a low boiling temperature refrigerant's ratio is calculated by utilizing the fact that as the low boiling temperature refrigerant's ratio changes, the non-azeotropic refrigerant mixture's temperature gradient also changes. Specifically, the low boiling temperature refrigerant's ratio is calculated from a correspondence among a difference between temperatures T1 and T2, a difference between temperatures T3 and T4, and a ratio of the low boiling temperature refrigerant to the non-azeotropic refrigerant mixture. Since it is temperature that needs to be measured in order to calculate the ratio of the low boiling temperature refrigerant, no pressure sensor is required in calculating the ratio of the low boiling temperature refrigerant. As a result, according to the first embodiment, it is possible to detect a change in the composition ratio of the non-azeotropic refrigerant mixture and to suppress the cost for manufacturing air conditioner 1.

Figure 4:
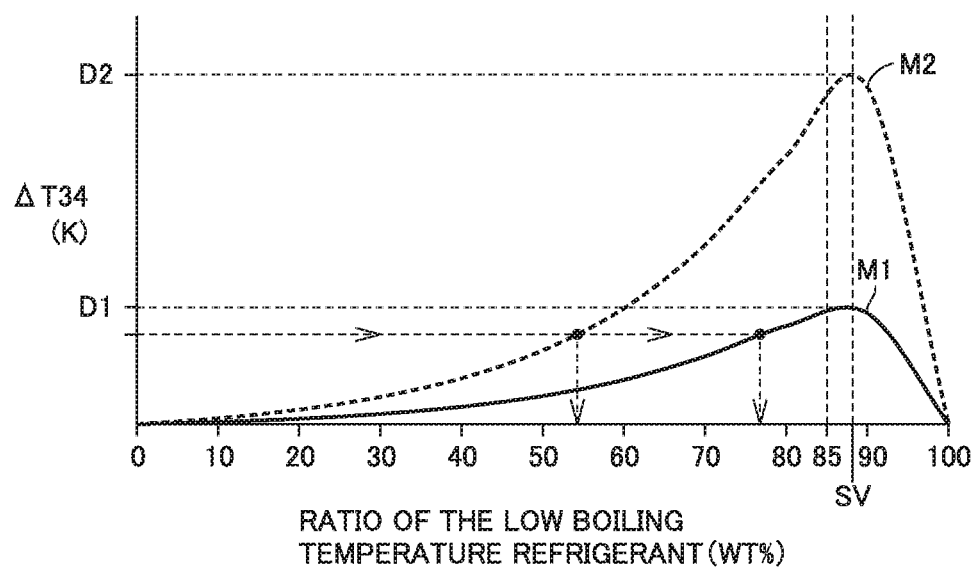
FIG. 4 is a diagram showing a correspondence between a temperature difference in absolute value and a ratio of a low boiling temperature refrigerant in the non-azeotropic refrigerant mixture.

FIG. 4 is a diagram showing a correspondence among an absolute value ΔT12 of a difference between temperatures T1 and T2, an absolute value ΔT34 of a difference between temperatures T3 and T4, and a ratio of the low boiling temperature refrigerant in the non-azeotropic refrigerant mixture. A curve M1 represents a correspondence between absolute value ΔT34 and the ratio of the low boiling temperature refrigerant when absolute value ΔT12 is 10 K. A curve M2 represents a correspondence between absolute value ΔT34 and the ratio of the low boiling temperature refrigerant when absolute value ΔT12 is 20 K. The correspondence among absolute values ΔT12, ΔT34 and the ratio of the low boiling temperature refrigerant shown in FIG. 4 can be appropriately calculated through an actual machine experiment or a simulation. While FIG. 4 shows correspondences for absolute values ΔT12 of 10 K and 20 K, respectively, a correspondence for absolute value ΔT12 having a different value can also be similarly calculated.

In FIG. 4, when an example with absolute value ΔT12 of 10 K and that with absolute value ΔT12 of 20 K are compared, they both present absolute value ΔT34 maximized when the low boiling temperature refrigerant's ratio is in a range of 85% to 90%. A maximum value D2 of absolute value ΔT34 when absolute value ΔT12 is 20 K is larger than a maximum value D1 of absolute value ΔT34 when absolute value ΔT12 is 10 K. This means that absolute value ΔT34 changes in a larger range when absolute value ΔT12 is 20 K. Thus, as absolute value ΔT12 increases, absolute value ΔT34 tends to change in a larger range.

When absolute values ΔT12 and ΔT34 are determined, the ratio of the tow boiling temperature refrigerant can be calculated by using the relationship among absolute values ΔT12, ΔT34 and the ratio of the low boiling temperature refrigerant shown in FIG. 4. In particular, when the ratio of the low boiling temperature refrigerant is set to a reference ratio SV or less (for example, 85% in FIG. 5) at which ΔT34 is maximized, and absolute value ΔT12 is determined, the ratio of the low boiling temperature refrigerant monotonically increases as absolute value ΔT34 increases. Accordingly, when the ratio of the low boiling temperature refrigerant is smaller than the reference ratio, and absolute values ΔT12 and ΔT34 are determined, the ratio of the low boiling temperature refrigerant is also uniquely determined. Accordingly, by setting the ratio of the low boiling temperature refrigerant in the non-azeotropic refrigerant mixture to be introduced into air conditioner 1, for example, to 85% or less, a control using the ratio of the low boiling temperature refrigerant, such as controlling a degree of superheat, can be simplified. The upper limit of the low boiling temperature refrigerant in the non-azeotropic refrigerant mixture to be introduced into air conditioner 1 is not limited to 85%, and can be calculated as appropriate through an actual machine experiment or a simulation.

Figure 5:
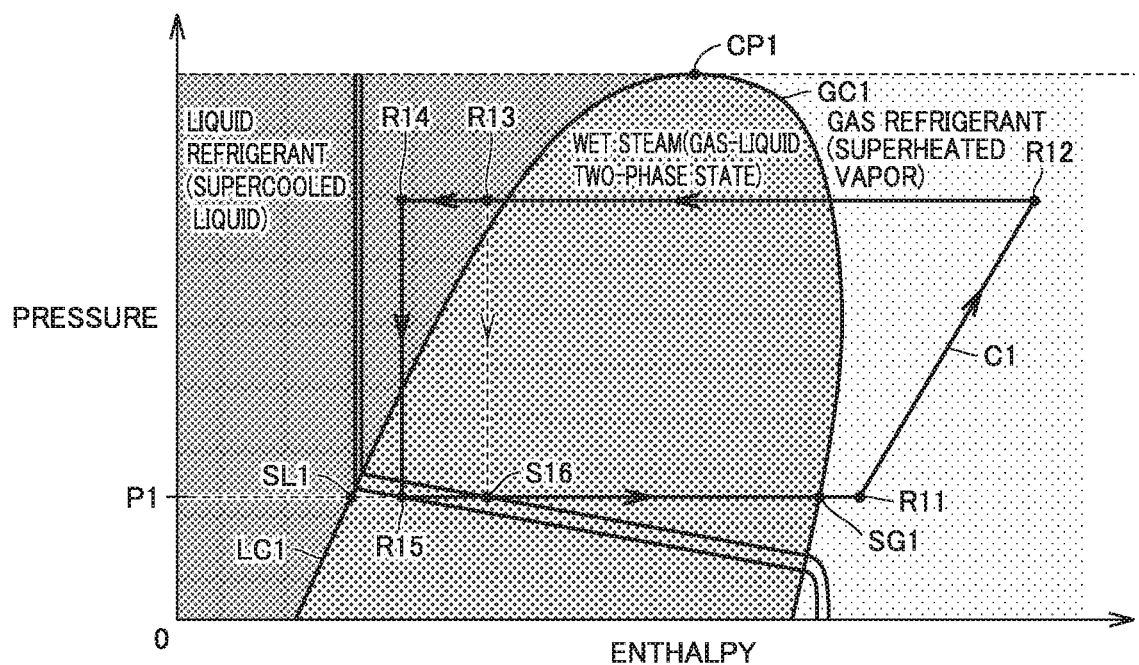
FIG. 5 is a P-h diagram showing a pressure-enthalpy relationship of non-azeotropic refrigerant mixture in the first embodiment.

FIG. 5 is a P-h diagram showing a pressure-enthalpy relationship of the non-azeotropic refrigerant mixture in air conditioner 1 shown in FIG. 1. In FIG. 5, the non-azeotropic refrigerant mixture in air conditioner 1 circulates from a point R11 via a point R12, a point R13, a point R14 and a point R15 back to point R11, i.e., through a cycle C1. A state change from point R11 to point R12 represents a process of compression of the non-azeotropic refrigerant mixture by compressor 110. A state change from point R12 to point R13 represents a process of condensation of the refrigerant by first heat exchanger 120. A state change from point R13 to point R14 represents a process of cooling the non-azeotropic refrigerant mixture by second heat exchanger 130. A state change from point R14 to point R15 represents a process of adiabatic expansion of the non-azeotropic refrigerant mixture by expansion valve 140. A state change from point R15 to point R11 represents a process of evaporation of the non-azeotropic refrigerant mixture by third heat exchanger 150.

With reference to FIGS. 1 and 5, the non-azeotropic refrigerant mixture flowing between expansion valve 140 and third heat exchanger 150 is in a state in FIG. 5 at point R15, which is the start point of the evaporation process by third heat exchanger 150. In contrast, the non-azeotropic refrigerant mixture flowing between third heat exchanger 150 and compressor 110 is in a state in FIG. 5 at point R11, which is the end point of the evaporation process by third heat exchanger 150.

The non-azeotropic refrigerant mixture flowing between connecting point JB and second heat exchanger 130 is before it is cooled by second heat exchanger 130, and accordingly, it is in a state in FIG. 5 at point R13. The non-azeotropic refrigerant mixture flowing between capillary 142 and connecting point JC is the non-azeotropic refrigerant mixture in the state for point R13 that is adiabatically decompressed by capillary 141. Its enthalpy is substantially equal to an enthalpy in FIG. 5 at point R13. Further, capillary 141 is connected to a flow path between third heat exchanger 150 and compressor 110 via second bypass path 162 and first bypass path 161. The pressure of the non-azeotropic refrigerant mixture flowing between capillary 141 and connecting point JC is substantially equal to the pressure at point R11 corresponding to a state of the refrigerant between third heat exchanger 150 and compressor 110. The pressure through the evaporation process by third heat exchanger 150 is substantially constant. The non-azeotropic refrigerant mixture flowing between capillary 141 and connecting point JC is in a state at a point R16 in the evaporation process by third heat exchanger 150, which is substantially equal in enthalpy to point R13.

The non-azeotropic refrigerant mixture flowing between second heat exchanger 130 and connecting point JA is after it is cooled by second heat exchanger 130, and accordingly, it is in a state in FIG. 5 at point R14. The non-azeotropic refrigerant mixture flowing between capillary 141 and connecting point JC is the non-azeotropic refrigerant mixture in the state for point R14 that is adiabatically decompressed by capillary 142. Its enthalpy is substantially equal to an enthalpy at point R14. The enthalpy at point R14 is substantially equal to the enthalpy of the state at point R14 that is adiabatically expanded, or the enthalpy of the state at point R15. Further, capillary 142 is connected via first bypass path 161 to a flow path between third heat exchanger 150 and compressor 110. The pressure of the non-azeotropic refrigerant mixture flowing between capillary 142 and connecting point JC is substantially equal to the pressure at point R11 corresponding to the state of the non-azeotropic refrigerant between third heat exchanger 150 and compressor 110. Point R11 is the end point of the evaporation process by third heat exchanger 150. The pressure through the evaporation process is substantially constant. The pressure at point R11 is substantially equal to the pressure at point R15 which is the start point of the evaporation process. The enthalpy at point R15 is substantially equal to the enthalpy at point R14. It can be said that the non-azeotropic refrigerant mixture flowing between capillary 142 and connecting point JC is in a state in FIG. 5 at point R15.

In a region where the non-azeotropic refrigerant mixture is wet steam, between point R13 and point R14 where pressure is substantially constant, there is caused a temperature gradient with temperature rising from point R13 (temperature T3) toward point R14 (temperature T4). In the first embodiment, the fact that absolute value ΔT12 of a difference between temperatures T1 and T2, absolute value ΔT34 of a difference between temperatures T3 and T4, and the ratio of the low boiling temperature refrigerant have a predetermined relationship (see FIG. 4) is exploited to calculate the ratio of the low boiling temperature refrigerant from absolute value ΔT12 and absolute value ΔT34.

Figure 6:
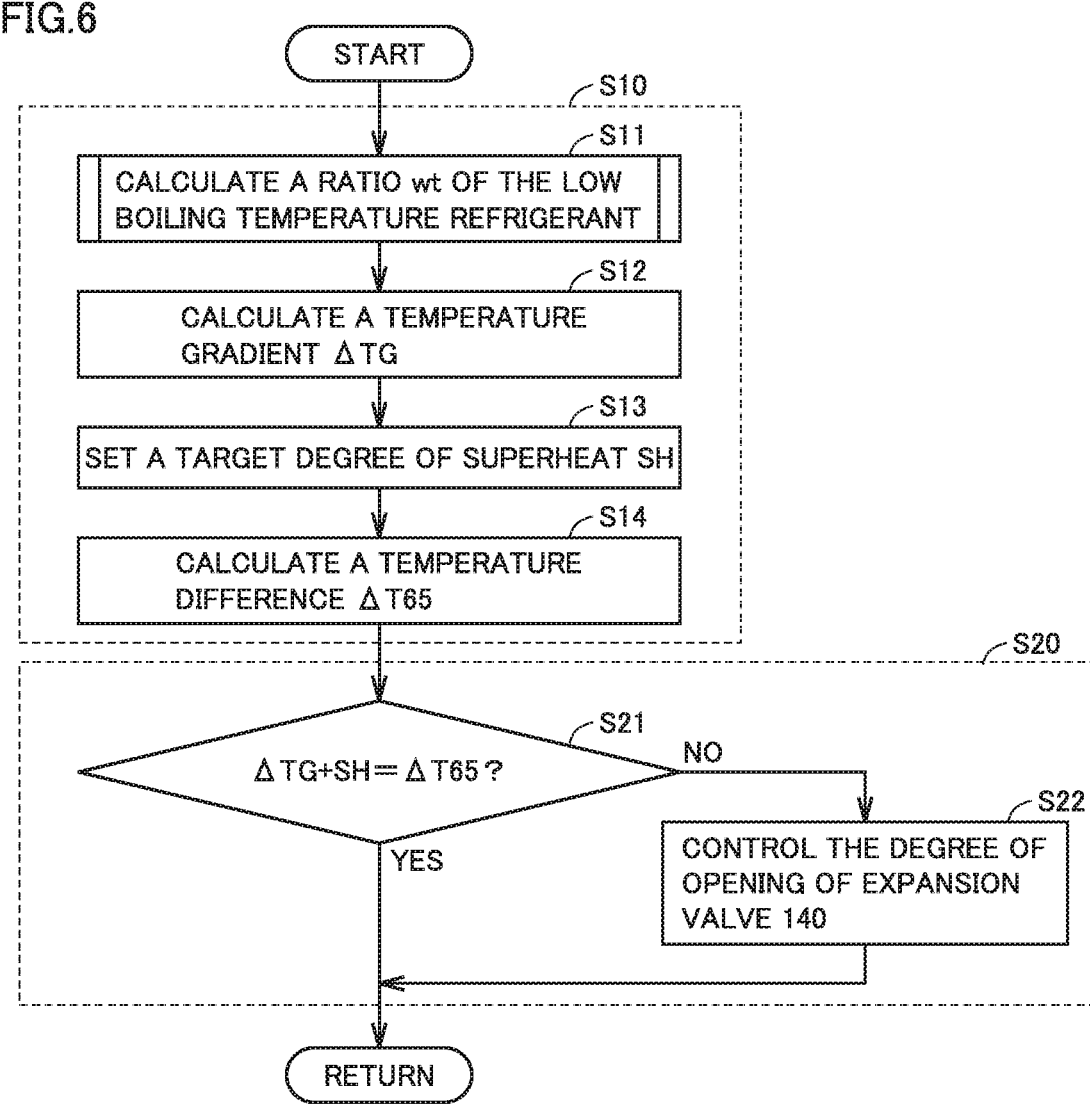
FIG. 6 is a flowchart for illustrating controlling a degree of superheat, as done in the first embodiment.

In the first embodiment, a degree of superheat is controlled depending on the ratio of the low boiling temperature refrigerant. FIG. 6 is a flowchart for illustrating how a degree of superheat is controlled by controller 12 shown in FIG. 1. The process shown in FIG. 6 is performed through a main routine (not shown) performed by controller 12 for controlling air conditioner 1 periodically or when a predetermined event occurs. S10 in FIG. 3 includes S11 to S14 in FIG. 6. S20 of FIG. 3 includes S21 and S22 of FIG. 6.

As shown in FIG. 6, controller 12 calculates a ratio wt of the low boiling temperature refrigerant in S11 and proceeds to S12. From ratio wt of the low boiling temperature refrigerant, controller 12 in S12 calculates a temperature gradient ΔTG for the pressure in the evaporation process and proceeds to S13. Temperature gradient ΔTG is a difference between the temperature at point SG1 and the temperature at point SL1 in FIG. 4.

Referring again to FIG. 6, controller 12 in S13 sets a target degree of superheat SH from temperatures T5 and T6, and proceeds to S14. Controller 12 in S14 calculates a temperature difference ΔT65 between temperature T6 at the end point of the evaporation process and temperature T5 at the start point thereof (i.e., ΔT65=T6−T5), and proceeds to S21.

In S21, controller 12 determines whether or not temperature difference ΔT65 is equal to a sum of temperature gradient ΔTG and target degree of superheat SR in S21, when a difference between temperature difference ΔT65 and the sum of temperature gradient ΔTG and target degree of superheat SH has an absolute value smaller than a threshold value, it may be determined that temperature difference ΔT65 is equal to the sum of temperature gradient ΔTG and target degree of superheat SH.

When temperature difference ΔT65 is not equal to the sum of temperature gradient ΔTG and target degree of superheat SH (NO in S21), controller 12 proceeds to S22. In S22, controller 12 controls the degree of opening of expansion valve 140 to allow temperature difference ΔT65 to be equal to the sum of temperature gradient ΔTG and target degree of superheat SH, and subsequently returns to the main routine. When temperature difference ΔT65 is equal to the sum of temperature gradient ΔTG and target degree of superheat SH (YES in S21), controller 12 returns to the main routine.

As shown in FIG. 6, by calculating the ratio of the low boiling temperature refrigerant when a degree of superheat is controlled, a target degree of superheat can be set that is optimum for the time when the degree of superheat is controlled. As a result, controlling the degree of superheat to be an optimum degree of superheat can be continued.

Figure 7:
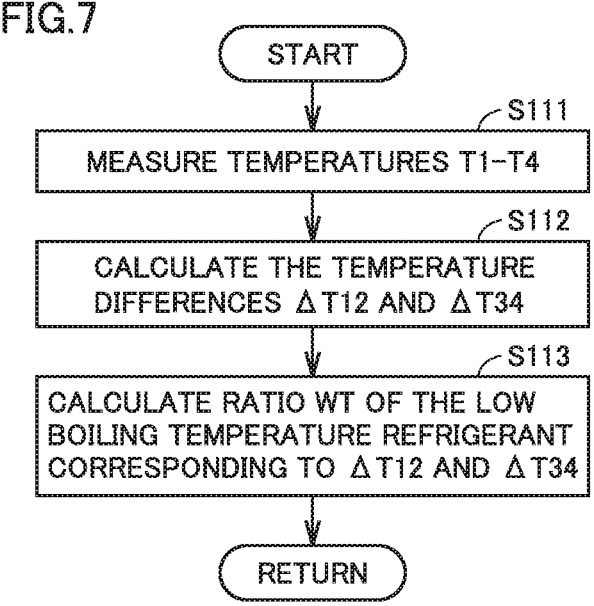
FIG. 7 is a flowchart for illustrating a process of calculating a ratio of a low boiling temperature refrigerant.

FIG. 7 is a flowchart, for illustrating a process of calculating a ratio of a low boiling temperature refrigerant, as performed in FIG. 6 at S11. The process shown in FIG. 7 is performed as necessary through a main routine (not shown) performed by controller 12 for controlling air conditioner 1 or a subroutine (not shown) invoked from the main routine.

As shown in FIG. 7, controller 12 measures temperatures T1 to T4 (see FIG. 1) in S111 and proceeds to S112. In S112, controller 12 calculates the temperatures' differences in absolute values ΔT12 (=[T1−T2]) and ΔT34 (=[T3−T4]), and proceeds to S113. In S113, controller 12 uses the relationship among absolute values ΔT12, ΔT34 and ratio wt of the low boiling temperature refrigerant (see FIG. 4) to calculate ratio wt of the low boiling temperature refrigerant corresponding to absolute values ΔT12 and ΔT34, and returns to the main routine or the subroutine.

By performing the process shown in FIG. 7, ratio wt of the low boiling temperature refrigerant can be calculated using a temperature sensor without a pressure sensor.

As the capacity of compressor 110 increases, the heat exchange in second heat exchanger 130 is promoted, and accordingly, absolute value ΔT12 increases. As has been described above, as absolute value ΔT12 increases, absolute value ΔT34 changes in a larger range. Accordingly, as absolute value ΔT12 increases, a difference by which absolute value ΔT34 changes when ratio wt of the low boiling temperature refrigerant changes increases. That is, as absolute value ΔT12 increases, even a slight change of ratio wt of the low boiling temperature refrigerant is easily detected as a change of absolute value ΔT34. As a result, ratio wt of the low boiling temperature refrigerant can be calculated more precisely.

Accordingly, in the first embodiment, when a driving frequency f of compressor 110 is larger than a reference frequency fs1, a process of calculating the ratio of the low boiling temperature refrigerant is performed. Reference frequency fs1 is determined depending on the resolution of temperature sensors 133, 134. That is, when driving frequency f is lower than reference frequency fs1, absolute value ΔT34 changes in a smaller range, and with the resolution of temperature sensors 133 and 134, it can be difficult to capture a change of ratio wt of the low boiling temperature refrigerant as a change of absolute value ΔT34.

Figure 8:
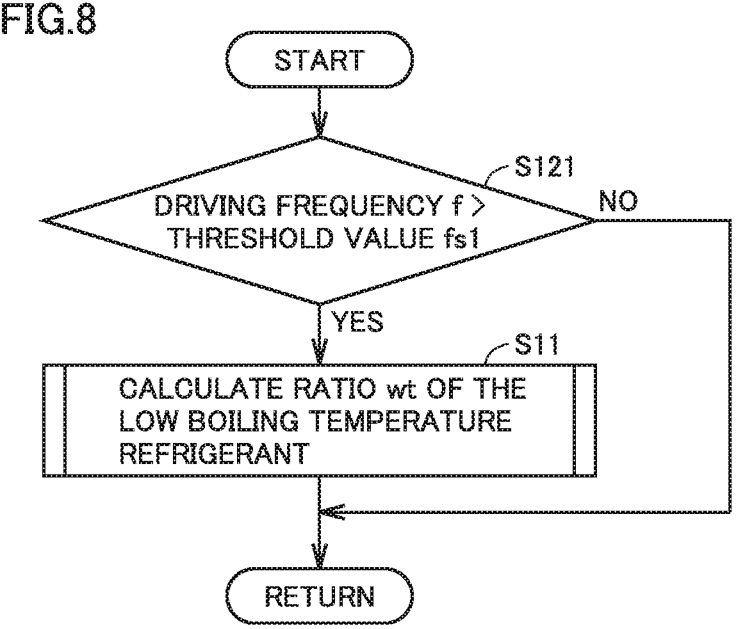
FIG. 8 is a flowchart for illustrating a process of calculating a ratio of a low boiling temperature refrigerant.

FIG. 8 is a flowchart for illustrating a process performed in controller 12 shown in FIG. 1 to calculate the ratio of the low boiling temperature refrigerant depending on driving frequency f of compressor 110. The process shown in FIG. 8 is performed as necessary through a main routine (not shown) performed by controller 12 for controlling air conditioner 1 or a subroutine (not shown) invoked from the main routine. S11 in FIG. 8 is the process shown in FIG. 7.

As shown in FIG. 8, in S121, controller 12 determines whether driving frequency f of compressor 110 is larger than reference frequency fs1. When driving frequency f is larger than reference frequency fs1 (YES in S121), controller 12 calculates ratio wt of the low boiling temperature refrigerant in S11 and returns to the main routine or the subroutine. In S11, the process shown in FIG. 5 is performed. When driving frequency f is equal to or less than reference frequency fs1 (NO in S121), controller 12 returns to the main routine or the subroutine.

The process as shown in FIG. 8 allows ratio wt of the low boiling temperature refrigerant to be calculated when a change of ratio wt of the low boiling temperature refrigerant can be captured via the resolution of temperature sensors 133 and 134 as a change of absolute value ΔT34. As a result, ratio wt of the low boiling temperature refrigerant can be calculated more precisely.

In air conditioner 1, when the low boiling temperature refrigerant leaks, the ratio of the low boiling temperature refrigerant is decreased to be smaller than a ratio that the low boiling temperature refrigerant has in the non-azeotropic refrigerant mixture when the non-azeotropic refrigerant mixture is introduced into air conditioner 1 (i.e., to be smaller than a suitable value). Further, when refrigerant different from the non-azeotropic refrigerant mixture that is supposed to be introduced into air conditioner 1 is introduced into air conditioner 1, the ratio of the low boiling temperature refrigerant in the introduced refrigerant may be different from the suitable value.

Figure 9:
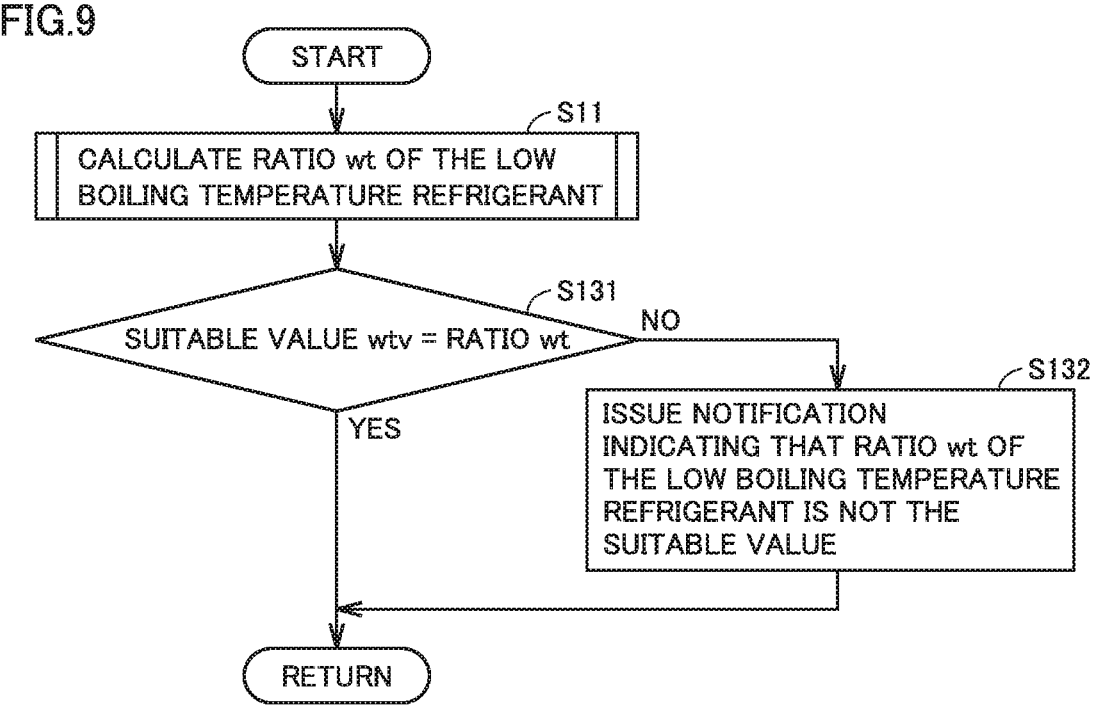
FIG. 9 is a flowchart for illustrating a process of notifying a user.

Accordingly, in the first embodiment, when air conditioner 1 is in operation, and the ratio of the low boiling temperature refrigerant in the non-azeotropic refrigerant mixture is different from the suitable value, the user is notified accordingly. FIG. 9 is a flowchart for illustrating a process done by controller 12 shown in FIG. 1 to notify a user that the ratio of the low boiling temperature refrigerant is different from the suitable value. The process shown in FIG. 9 is performed through a main routine (not shown) performed by controller 12 for controlling air conditioner 1 periodically or when a predetermined event occurs.

As shown in FIG. 9, controller 12 calculates ratio wt of the low boiling temperature refrigerant in S11 and proceeds to S131. In S131, controller 12 determines whether or not ratio wt of the low boiling temperature refrigerant is equal to a suitable value wtv. In S131, when the absolute value of the difference between ratio wt of the low boiling temperature refrigerant and suitable value wtv is smaller than a threshold value, it may be determined that they are equal.

When ratio wt of the low boiling temperature refrigerant is not equal to suitable value wtv (NO in S131), controller 12 in S132 controls notifier 13 to issue notification indicating that ratio wt of the low boiling temperature refrigerant is not suitable value wtv, and returns to the main routine. The notification can be issued for example audibly, by turning on a lamp, or by transmitting a message. When ratio wt of the low boiling temperature refrigerant is equal to suitable value wtv (YES in S131), controller 12 returns to the main routine.

By performing the process as shown in FIG. 9, the user can be informed that the ratio of the low boiling temperature refrigerant has changed while air conditioner 1 is in operation. As a result, the user can respond promptly when an error related to the refrigerant, such as leakage of the low boiling temperature refrigerant or erroneous introduction of refrigerant, occurs.

While the ratio of the low boiling temperature refrigerant in the non-azeotropic refrigerant mixture circulating through air conditioner 1 changes, there is a case in which air conditioner 1 has no abnormality. For example, it is when the user intentionally changes the refrigerant of air conditioner 1 to refrigerant having a lower GWP. Accordingly, it is preferable for example that suitable value wtv be a value input by the user or be resettable by the user to ratio wt that the low boiling temperature refrigerant has when the notification in S113 is performed.

In the first embodiment, a time for maintenance of air conditioner 1 is determined. FIGS. 10(a), 10(b) and 10(c) show a decrease of the ratio of the low boiling temperature refrigerant, a decrease of the amount of the non-azeotropic refrigerant mixture, and a decrease of a coefficient of performance (COP), respectively, as time elapses. A COP is an index serving as a measure of the energy consumption efficiency of air conditioner 1, and means that the larger the value, the better the energy consumption efficiency of air conditioner 1 is.

When the low boiling temperature refrigerant is leaking, the ratio of the low boiling temperature refrigerant decreases as time elapses, as shown in FIG. 10(a). As the ratio of the low-boiling temperature refrigerant decreases, the overall amount of the non-azeotropic refrigerant mixture also decreases as shown in FIG. 10(b). As the amount of the non-azeotropic refrigerant mixture circulating through air conditioner 1 decreases, the COP of air conditioner 1 also decreases as shown in FIG. 10(c). A decrease of the COP means a decrease of the air conditioning capacity of air conditioner 1. When the COP excessively falls, the air-conditioning operation often becomes difficult. Accordingly, when the COP Falls below a lower limit value cps, the air conditioning operation is normally, compulsorily stopped.

Accordingly, in the first embodiment, an index value for a tendency of decreasing of the non-azeotropic refrigerant mixture (a portion indicated in FIG. 10(a) by a dotted line) is calculated from a history of a continuous calculation of the ratio of the low boiling temperature refrigerant, and the index value is used to estimate a ratio of the low boiling temperature refrigerant expected after a predetermined period of time elapses. When an air conditioning operation at the estimated ratio of the low boiling temperature refrigerant is difficult to perform, the user is urged to perform maintenance including, for example, introducing the non-azeotropic refrigerant mixture, replacing it with another, or performing maintenance including that for piping.

Figure 11:
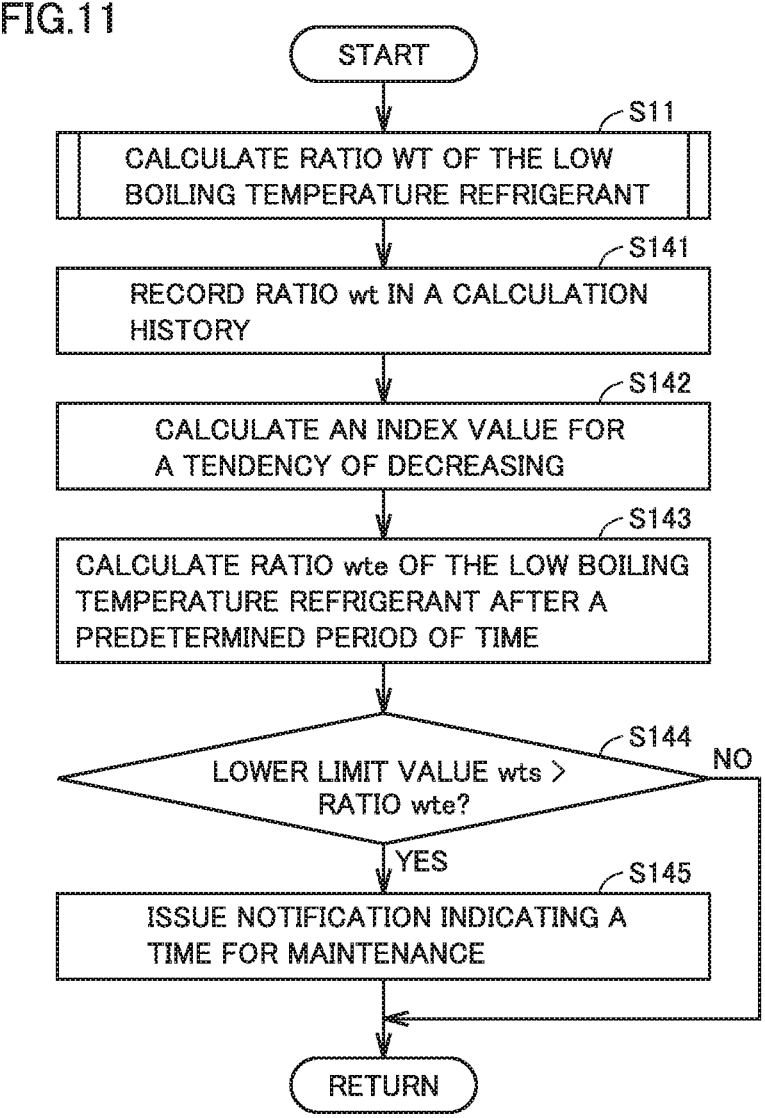
FIG. 11 is a flowchart for illustrating a process of determining a time for maintenance.

FIG. 11 is a flowchart for illustrating a process performed in controller 12 of FIG. 1 to determine a time to perform maintenance. The process shown in FIG. 11 is performed through a main routine (not shown) performed by controller 12 for controlling air conditioner 1 periodically or when a predetermined event occurs. Storage unit 122 has stored therein a history of calculation of ratio wt of the low boiling temperature refrigerant.

As shown in FIG. 11, controller 12 calculates ratio wt of the low boiling temperature refrigerant in S11 and proceeds to S141. Controller 12 in S141 records ratio wt in the calculation history and proceeds to S142. In S142, controller 12 uses the calculation history to calculate a decreasing rate of the ratio of the low boiling point refrigerant per day, for example, as an index value for a tendency of decreasing of the ratio of the low boiling temperature refrigerant, and proceeds to S143. In step S143, controller 12 calculates a ratio wte of the low boiling temperature refrigerant for example for one month later, and proceeds to step S144. Controller 12 determines whether ratio wte estimated in S144 is smaller than a lower limit value wts. Lower limit value wts is desirably set to a ratio of the low boiling temperature refrigerant corresponding to a COP of a level at which the air conditioning operation is difficult to perform. Lower limit value wts can be appropriately determined through an actual machine experiment or a simulation.

When ratio wte is smaller than lower limit value wts (YES in S144), controller 12 in S145 controls notifier 13 to notify the user that a time for maintenance has arrived, and returns to the main routine. The notification can be issued for example audibly, by turning on a lamp, or by transmitting a message. When ratio wte is equal to or larger than lower limit value wts (NO in S144), controller 12 returns to the main routine.

By performing the process as shown in FIG. 11, the user can be urged to perform maintenance before the air conditioning operation is difficult to perform, and a situation where air conditioner 1 suddenly stops can be avoided. As a result, air conditioner 1 can be operated as planned.

In the first embodiment, as has been described above, inside second heat exchanger 130, a pipe through which the liquid refrigerant from first heat exchanger 120 flows and a pipe through which the wet steam from capillary 141 flows are disposed to allow the flow of the liquid refrigerant from the first heat exchanger 120 to be opposite in direction to the flow of the wet steam from capillary 141.

As has been described above, non-azeotropic refrigerant mixture in the form of wet steam under a determined pressure presents a temperature gradient, and it has a temperature increasing as the enthalpy increases. The wet steam from capillary 141 advances through a pipe inside second heat exchanger 130 while receiving heat from the liquid refrigerant output from first heat exchanger 120. Accordingly, the temperature of the wet steam from capillary 141 rises as the wet steam advances through the pipe of second heat exchanger 130.

In contrast, the liquid refrigerant from first heat exchanger 120 advances through a pipe inside second heat exchanger 130 while applying heat to the wet steam output from capillary 141. Accordingly, the temperature of the liquid refrigerant from first heat exchanger 120 falls as the liquid refrigerant advances through the pipe of second heat exchanger 130. As the flow of the liquid refrigerant from first heat exchanger 120 and the flow of the wet steam from capillary 141 are opposite to each other in direction, a temperature difference between the liquid refrigerant from first heat exchanger 120 and the wet steam from capillary 141 can be kept substantially constant from one end of second heat exchanger 130 to the other end of second heat exchanger 130. Accordingly, the non-azeotropic refrigerant mixture can continue steady heat exchange while the non-azeotropic refrigerant mixture passes through second heat exchanger 130. As a result, between the liquid refrigerant from first heat exchanger 120 and the wet steam from capillary 141, heat exchange can be done more efficiently than when the liquid refrigerant and the wet steam flow in the same direction.

As a result of improved heat exchange efficiency, second heat exchanger 130 can be reduced in size to be smaller than when the liquid refrigerant from first heat exchanger 120 and the wet steam from capillary 141 flow in the same direction.

As the size of second heat exchanger 130 decreases, the pressure loss caused when the refrigerant passes through second heat exchanger 130 decreases. As a result, the air conditioning capacity of air conditioner 1 can be improved.

In the first embodiment, an example has been described in which temperature sensor 131 measures temperature T1 of the refrigerant flowing between connecting point JB and second heat exchanger 130. It suffices that the refrigerant having its temperature measured by temperature sensor 131 is refrigerant flowing between first heat exchanger 120 and second heat exchanger 130. For example, temperature sensor 131 may measure the temperature of the refrigerant flowing between first heat exchanger 120 and connecting point 1B. Further, in the first embodiment, an example has been described in which temperature sensor 132 measures temperature T2 of the refrigerant flowing between second heat exchanger 130 and connecting point JA. It suffices that the refrigerant having its temperature measured by temperature sensor 132 is refrigerant flowing between second heat exchanger 130 and expansion valve 140. Temperature sensor 132 may measure the temperature of the refrigerant flowing between connecting point JA and expansion valve 140, for example.

Thus, according to the first embodiment, the ratio of the low boiling temperature refrigerant in the non-azeotropic refrigerant mixture circulating through air conditioner 1 can be calculated without using a pressure sensor. As a result, air conditioner 1 allows a change in the composition ratio of the non-azeotropic refrigerant mixture to be detected while suppressing its manufacturing cost.

Modification of First Embodiment

In the first embodiment, an example has been described in which, as a decompressor, capillaries 141 and 142 which cannot be adjusted in degree of opening are used. In a second embodiment, an example will be described in which as a decompressor, an expansion valve adjustable in degree of opening, such as an LEV, is used.

Figure 12:
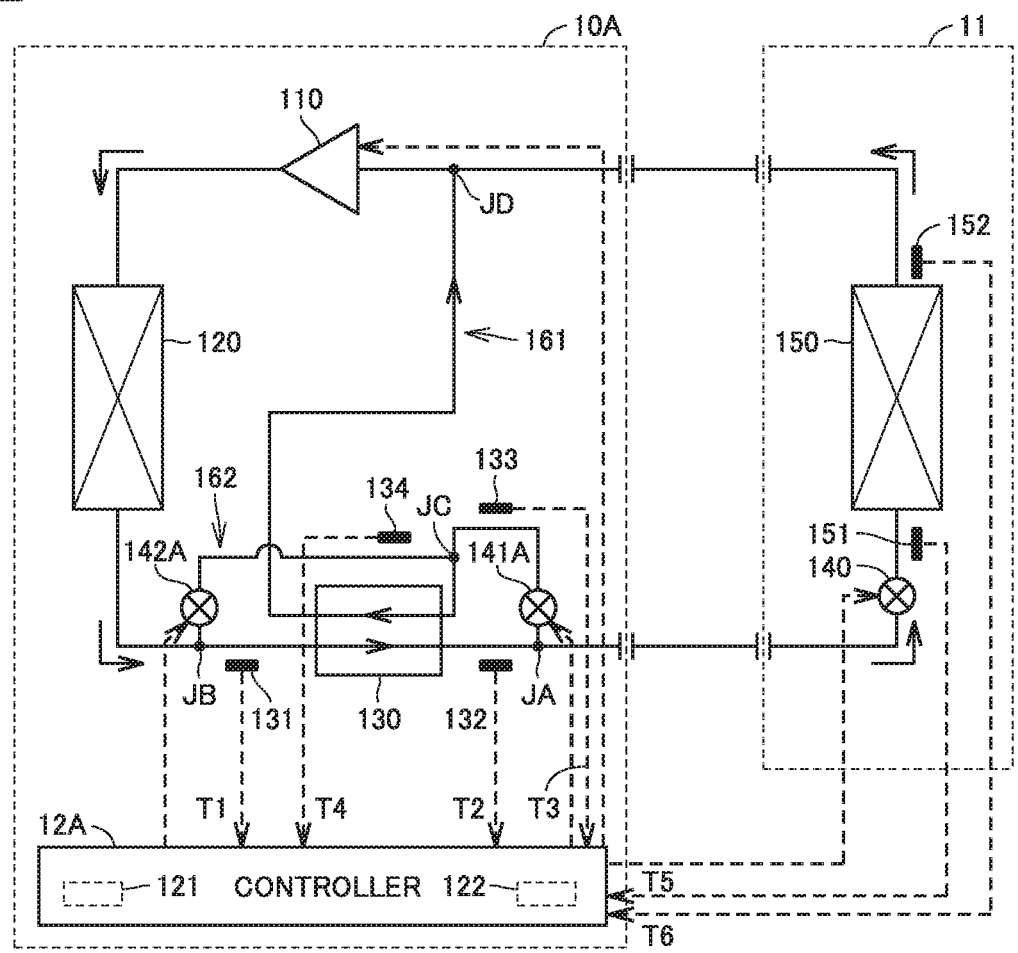
FIG. 12 is a functional block diagram showing a configuration of an air conditioner according to a variation of the first embodiment.

FIG. 12 is a functional block diagram showing a configuration of an air conditioner 1A according to a modification of the first embodiment. A difference between air conditioner 1 and air conditioner 1A is that capillaries 141 and 142 in air conditioner 1 are replaced with expansion valves 141A and 142A in air conditioner 1A and that expansion valves 141A and 142A have their opening degrees controlled by a controller 12A. The remainder in configuration is the same as that of air conditioner 1, and accordingly, will not be described redundantly.

As the capacity of compressor 110 decreases, the speed of the non-azeotropic refrigerant passing through the second heat exchanger decreases. As a result, the pressure loss caused when the non-azeotropic refrigerant mixture passes through third heat exchanger 150 decreases. Accordingly, when the capacity of compressor 110 is reduced to some extent, the pressure loss in third heat exchanger 150 no longer has a substantial effect on the air conditioning capacity of air conditioner 1. In such a case, it is substantially unnecessary to bypass the non-azeotropic refrigerant mixture to compressor 110 using first bypass path 161 and second bypass path 162 to reduce the pressure loss in the second heat exchanger. Rather, bypassing the non-azeotropic refrigerant mixture to compressor 110 in such a case would excessively reduce the amount of the non-azeotropic refrigerant mixture passing through third heat exchanger 150 and may significantly reduce the air conditioning capacity of air conditioner 1A.

Accordingly, in the modification of the first embodiment, when driving frequency f of compressor 110 is equal to or smaller than a reference frequency fs2, expansion valves 141A, 142A are closed to avoid using the first bypass path and the second bypass to bypass the non-azeotropic refrigerant mixture to compressor 110. Such control can prevent air conditioner 1A from having a reduced air conditioning capacity.

Reference frequency fs2 can be calculated through an actual machine experiment or a simulation. It is desirable that reference frequency fs2 be calculated as a driving frequency corresponding to such a capacity of compressor 110 that the pressure loss in third heat exchanger 150 does not have a substantial effect on the air conditioning capacity of air conditioner 1.

Figure 13:
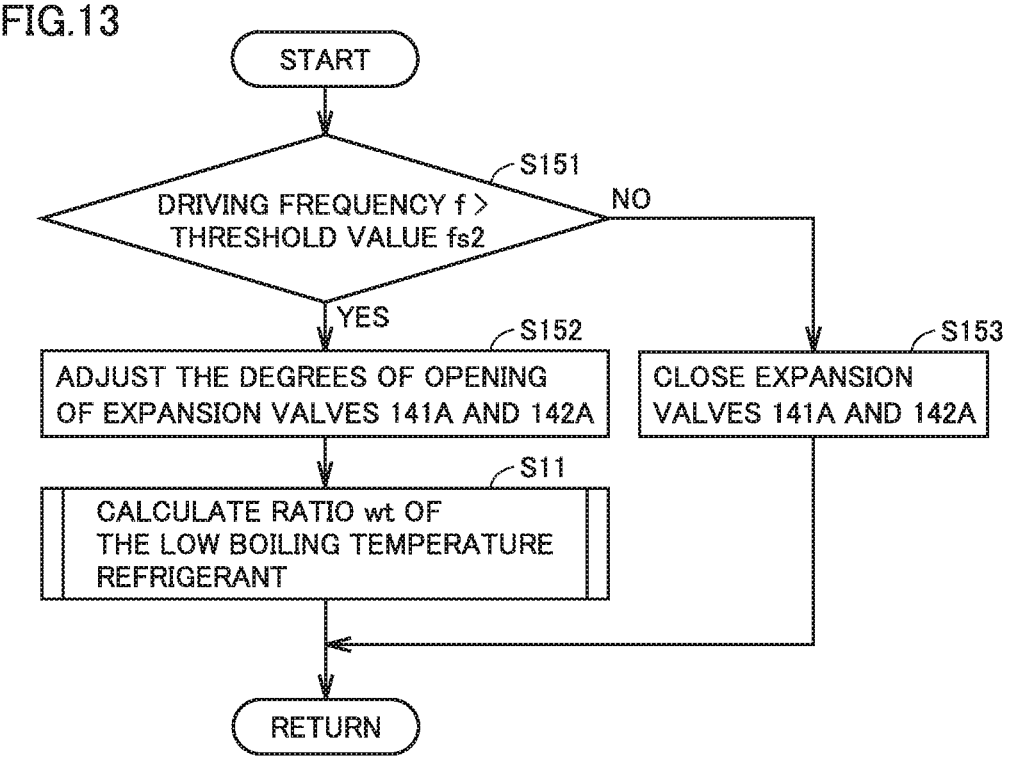
FIG. 13 is a flowchart for illustrating a process of controlling an expansion valve.

FIG. 13 is a flowchart for illustrating a process performed by controller 12A in FIG. 12 to control expansion valves 141A and 142A. The process shown in FIG. 13 is performed when it is necessary to calculate the ratio of the low-boiling temperature refrigerant through a main routine (not shown) performed by controller 12A for controlling air conditioner 1A or a subroutine invoked from the main routine.

As shown in FIG. 13, in S151, controller 12A determines whether driving frequency f of compressor 110 is larger than reference frequency fs2. When driving frequency f is larger than reference frequency fs2 (YES in S151), in S152, controller 12A adjusts the degrees of opening of expansion valves 141A and 142A, respectively, to allow expansion valves 141A, 142A to decompress the non-azeotropic refrigerant mixture, and proceeds to S11. Controller 12A calculates ratio wt of the low boiling temperature refrigerant in S11 and returns to the main routine or the subroutine. When driving frequency f is equal to or smaller than reference frequency fs2 (NO in S151), controller 12A zeros the degree of opening of each of expansion valves 141A and 142A in S153, and returns to the main routine or the subroutine.

Thus, according to embodiment 1A, the ratio of the low boiling temperature refrigerant in the non-azeotropic refrigerant mixture circulating through air conditioner 1A can be calculated without using a pressure sensor. As a result, air conditioner 1 allows a change in the composition ratio of the non-azeotropic refrigerant mixture to be detected while suppressing its manufacturing cost.

According to embodiment 1A, it is possible to suppress reduction in the air conditioning capacity of air conditioner 1A when the capacity of compressor 110 is reduced to such an extent that the pressure loss in third heat exchanger 150 does not have a substantial effect on the air conditioning capacity of air conditioner 1A.

Second Embodiment

In the first embodiment, an example has been described in which a cooling operation is performed by circulating refrigerant in an order of compressor 110, first heat exchanger 120, expansion valve 140, and third heat exchanger 150. In a second embodiment, an example will be described in which a cooling operation can be switched to a heating operation and vice versa.

Figure 14:
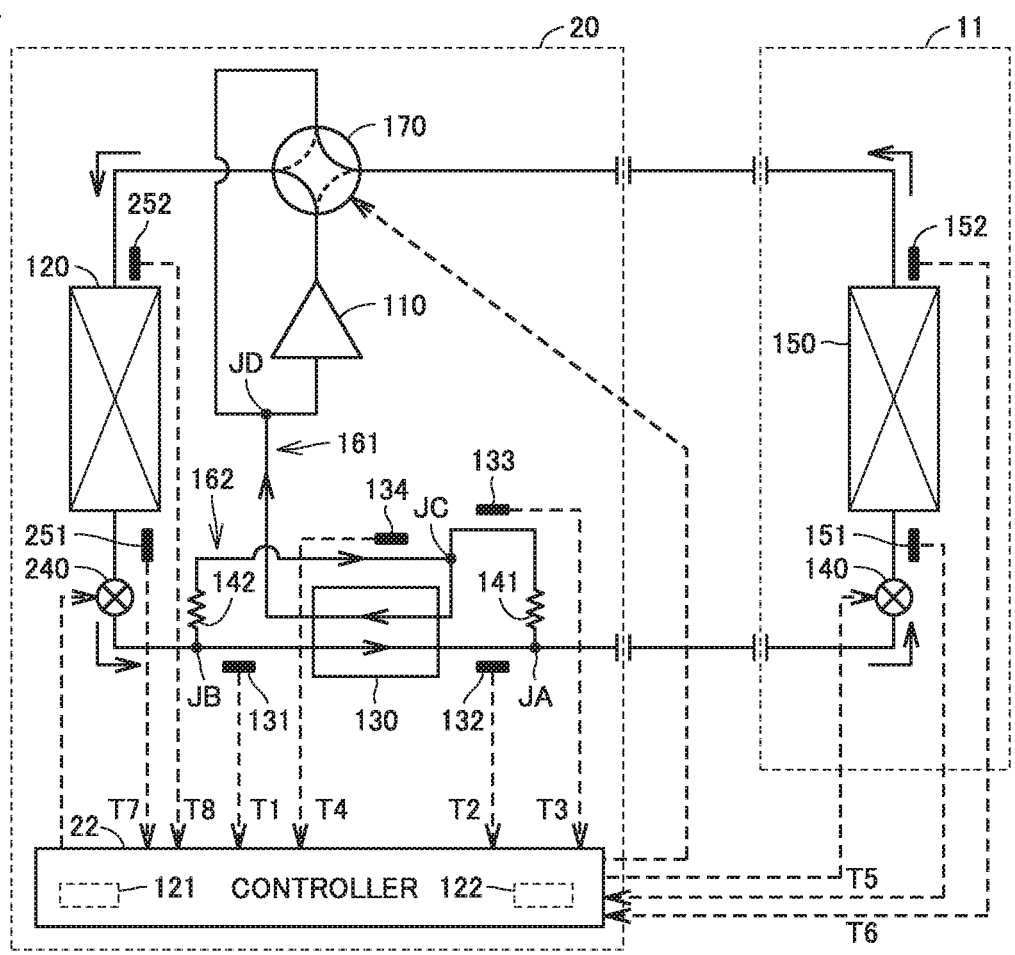
FIG. 14 is a functional block diagram showing a configuration of an air conditioner according to a second embodiment during a cooling operation.
Figure 15:
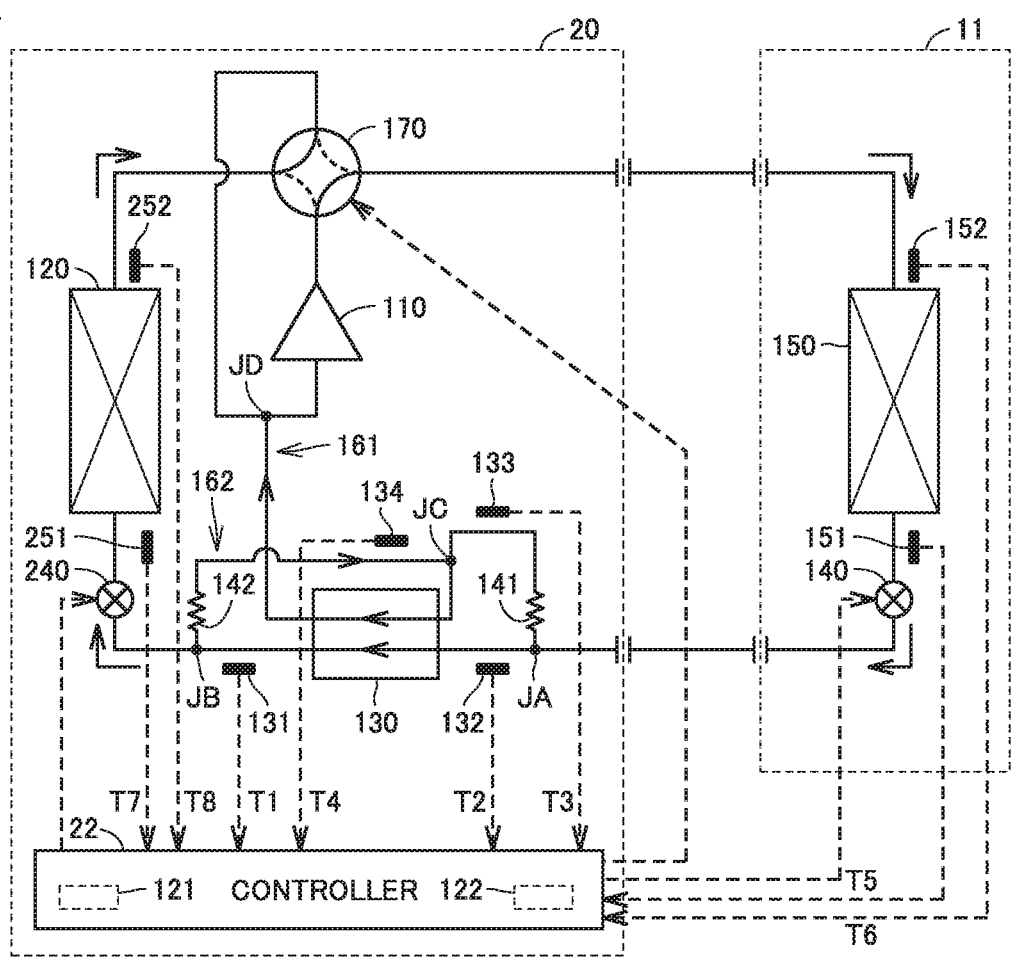
FIG. 15 is a functional block diagram showing a configuration of the air conditioner according to the second embodiment during a heating operation.

FIG. 14 is a functional block diagram showing a configuration of an air conditioner 2 according to the second embodiment during a cooling operation. FIG. 15 is a functional block diagram showing a configuration of air conditioner 2 according to the second embodiment during a heating operation. As shown in FIGS. 14 and 15, in addition to the configuration of air conditioner 1, air conditioner 2 further includes an expansion valve 240, and a four-way valve 170 for switching a flow path of the refrigerant. A controller 22 further receives signals from temperature sensors 251 and 252. Controller 22 adjusts the degrees of opening of expansion valves 140 and 240. Temperature sensor 251 measures a temperature T7 of the refrigerant flowing between expansion valve 240 and first heat exchanger 120. Temperature sensor 252 measures a temperature T8 of the refrigerant flowing between first heat exchanger 120 and compressor 110. The remainder in configuration is similar to that of the first embodiment, and accordingly, it will not be described redundantly.

As shown in FIG. 14, in the cooling operation, four-way valve 170 is controlled by controller 22 to form a flow path passing the non-azeotropic refrigerant mixture from third heat exchanger 150 to compressor 110 and also form a flow path passing the non-azeotropic refrigerant mixture from compressor 110 to first heat exchanger 120. Controller 22 during the cooling operation controls expansion valve 240 to be opened at a degree larger than a reference degree to prevent expansion valve 240 from providing substantial decompression. The non-azeotropic refrigerant mixture circulates in the order of compressor 110, first heat exchanger 120, second heat exchanger 130, expansion valve 140, and third heat exchanger 150. In the cooling operation, first heat exchanger 120 functions as a condenser, and third heat exchanger 150 functions as an evaporator. The P-h diagram in the cooling operation is the same as the P-h diagram in the first embodiment (see FIG. 5). Controller 22 during the cooling operation performs the FIG. 6 process of controlling a degree of superheat, as well as in the first embodiment.

As shown in FIG. 15, in the heating operation, four-way valve 170 is controlled by controller 22 to form a flow path passing the non-azeotropic refrigerant mixture from first heat exchanger 120 to compressor 110 and also form a flow path passing the refrigerant from compressor 110 to third heat exchanger 150. Controller 22 during the heating operation controls expansion valve 140 to be opened at a degree larger than the reference degree to prevent expansion valve 140 from providing substantial decompression. The non-azeotropic refrigerant mixture circulates in the order of compressor 110, third heat exchanger 150, second heat exchanger 130, expansion valve 240, and first heat exchanger 120. During the heating operation, first heat exchanger 120 functions as an evaporator and third heat exchanger 150 functions as a condenser.

Figure 16:
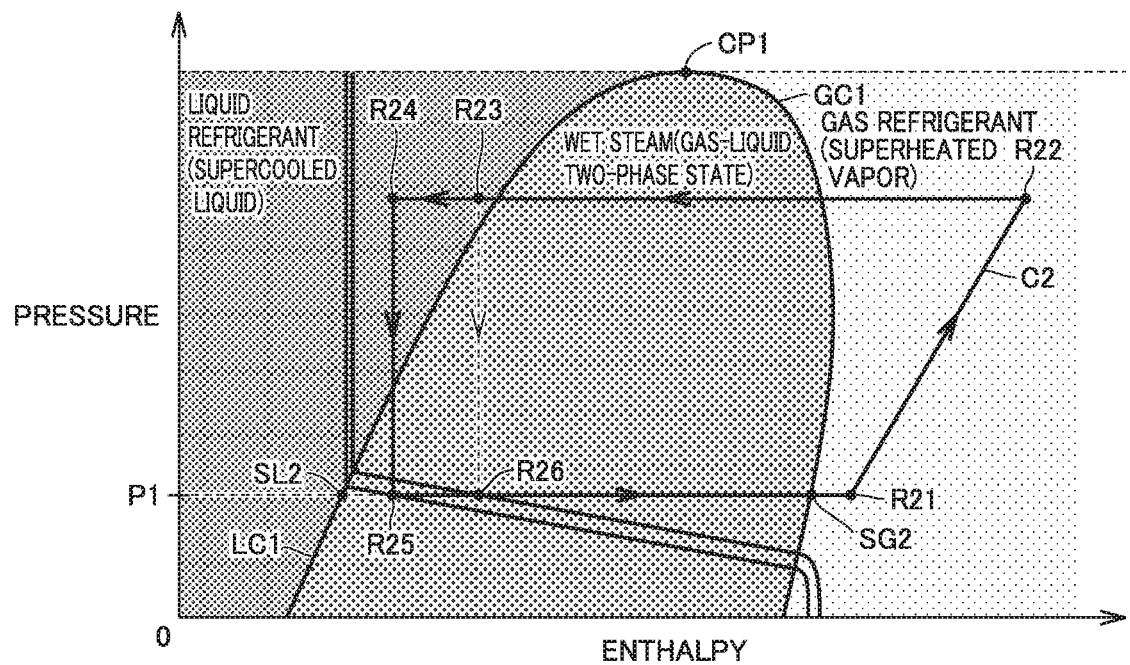
FIG. 16 is a P-h diagram showing a pressure-enthalpy relationship of non-azeotropic refrigerant mixture in the air conditioner in the second embodiment.

FIG. 16 is a P-h diagram showing a pressure-enthalpy relationship of the non-azeotropic refrigerant mixture in air conditioner 2 shown in FIG. 14. In FIG. 16, the non-azeotropic refrigerant mixture in air conditioner 2 circulates from a point R21 via a point R22, a point R23, a point R24 and a point R25 back to point R21, i.e., through a cycle C2. A state change from point R21 to point R22 represents a process of compression of the non-azeotropic refrigerant mixture by compressor 110. A state change from point R22 to point R23 represents a process of condensation of the non-azeotropic refrigerant mixture by third heat exchanger 150. A state change from point R23 to point R24 represents a process of cooling the non-azeotropic refrigerant mixture by second heat exchanger 130. A state change from point R24 to point R25 represents a process of adiabatic expansion off the non-azeotropic refrigerant mixture by expansion valve 240. A state change from point R25 to point R21 represents a process of evaporation of the non-azeotropic refrigerant mixture by first heat exchanger 120.

With reference to FIGS. 15 and 16, the non-azeotropic refrigerant mixture flowing between expansion valve 240 and first heat exchanger 120 is in the state at point R25, which is the start point of the evaporation process by first heat exchanger 120. In contrast, the non-azeotropic refrigerant mixture flowing between compressor 110 and third heat exchanger 150 is in the state at point R21, which is the end point of the evaporation process by first heat exchanger 120.

The non-azeotropic refrigerant mixture flowing between second heat exchanger 130 and connecting point JB is after it is cooled by second heat exchanger 130, and accordingly, it is in the state at point R24. The non-azeotropic refrigerant mixture flowing between capillary 142 and connecting point JC is the non-azeotropic refrigerant mixture in the state for point R24 that is adiabatically decompressed by expansion valve 141A. Its enthalpy is substantially equal to an enthalpy for point R24. Further, expansion valve 141A is connected via second bypass path 162 and first bypass path 161 to a flow path between first heat exchanger 120 and compressor 110. The pressure of the non-azeotropic refrigerant mixture having temperature T4 measured by temperature sensor 134 is substantially equal to the pressure at point R21 corresponding to a state of the refrigerant between first heat exchanger 120 and compressor 110. Point R21 is the end point of the evaporation process by first heat exchanger 120. The pressure through the evaporation process by first heat exchanger 120 is substantially constant. The pressure at point R21 is substantially equal to the pressure at point R25 which is the start point of the evaporation process. The enthalpy at point R25 is equal to the enthalpy at point R24. The non-azeotropic refrigerant mixture flowing between capillary 142 and connecting point JC is in the state at point R25.

The non-azeotropic refrigerant mixture flowing between connecting point JA and second heat exchanger 130 is before it is cooled by second heat exchanger 130, and accordingly, it is in the state at point R23. The non-azeotropic refrigerant mixture flowing between capillary 141 and connecting point JC is the non-azeotropic refrigerant mixture in the state for point R23 after it is adiabatically decompressed by capillary 142. Its enthalpy is substantially equal to the enthalpy at point R23, Further, expansion valve 142A is connected via first bypass path 161 to a flow path between first heat exchanger 120 and compressor 110. The pressure of the non-azeotropic refrigerant mixture flowing between capillary 141 and connecting point JC is substantially equal to the pressure at point R21 corresponding to the state of the non-azeotropic refrigerant between first heat exchanger 120 and compressor 110. Point R21 is the end point of the evaporation process. The pressure through the evaporation process is substantially constant. The non-azeotropic refrigerant mixture flowing between capillary 141 and connecting point JC is in a state in the evaporation process at a point R26, which is substantially equal in enthalpy to point R23.

In a region where the non-azeotropic refrigerant mixture is wet steam, between point R25 and point R26 where pressure is substantially constant, there is caused a temperature gradient with temperature rising from point R25 (temperature T4) toward point R26 (temperature T3). In the second embodiment, as well as the first embodiment, the fact that absolute value $\Delta T12$ of a difference between temperatures T1 and T2, absolute value $\Delta T34$ of a difference between temperatures T3 and T4, and the ratio of the low boiling temperature refrigerant have a predetermined relationship (see FIG. 4) is exploited to calculate the ratio of the low boiling temperature refrigerant. In the second embodiment, by using temperature differences' absolute values $\Delta T12$ and $\Delta T34$, the correspondence used for calculating the ratio of the low boiling temperature refrigerant in the cooling operation can also be exactly used in the heating operation.

Figure 17:
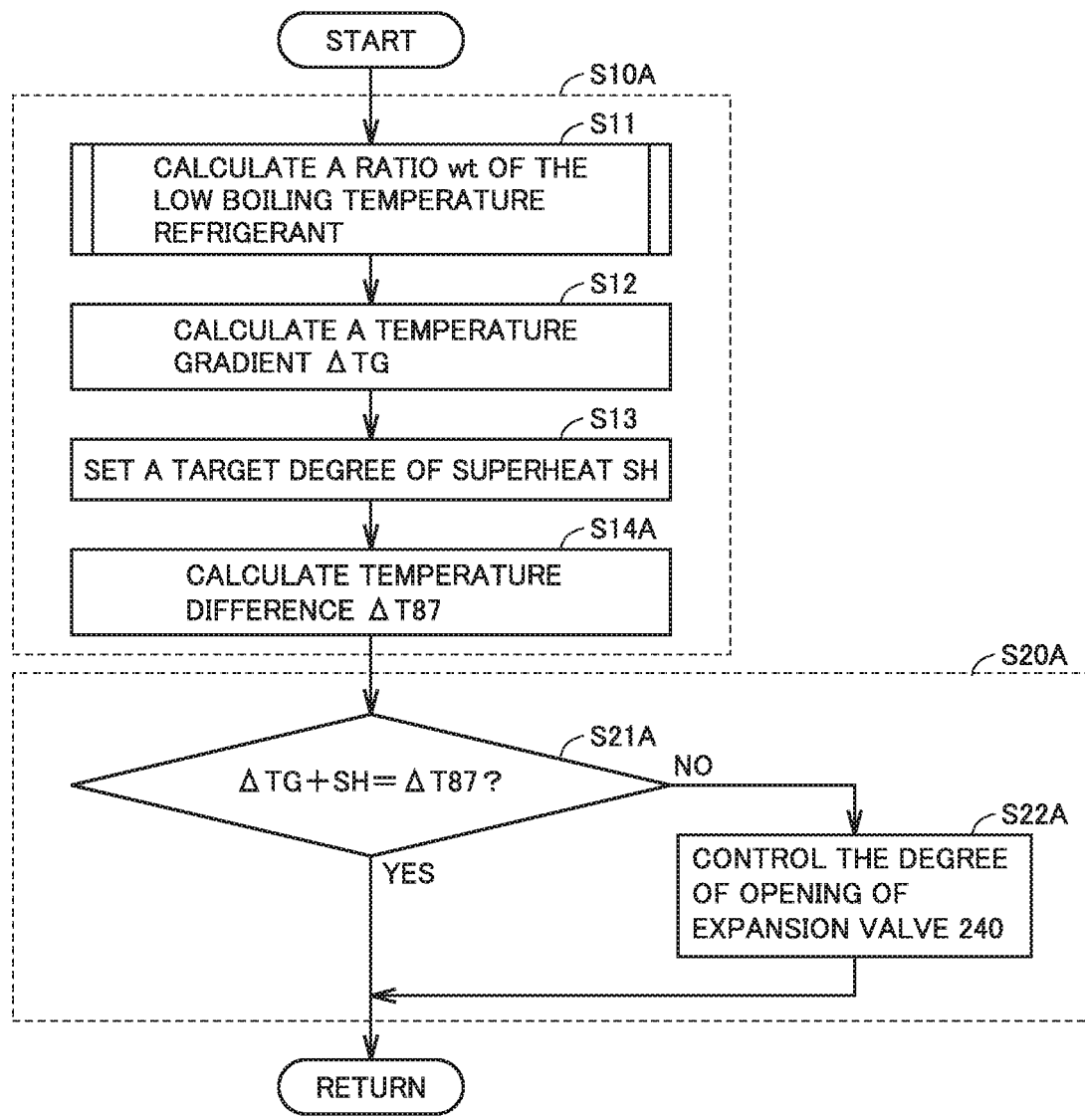
FIG. 17 is a flowchart for illustrating controlling a degree of superheat, as done in the second embodiment.

FIG. 17 is a flowchart for illustrating how a degree of superheat is controlled by controller 22 in the second embodiment. The process shown in FIG. 17 is performed through a main routine (not shown) performed by controller 22 for controlling air conditioner 2 periodically or when a predetermined event occurs.

As shown in FIG. 17, controller 22 calculates ratio wt of the low boiling temperature refrigerant in S11 and proceeds to S12. Controller 22 in S12 calculates temperature gradient $\Delta TG$ and proceeds to S13. Temperature gradient $\Delta TG$ is a difference between the temperature at a point SG2 and the temperature at a point SL2 in FIG. 16.

Referring again to FIG. 17, controller 22 in S13 sets target degree of superheat SH and proceeds to S14. Controller 22 in S14A calculates a temperature difference $\Delta T87$ between temperature T8 at the end point of the evaporation process and temperature T7 at the start point thereof (i.e., $\Delta 87=T8-T7$), and proceeds to S21A. In S21A, controller 22 determines whether or not temperature difference $\Delta T87$ is equal to a sum of temperature gradient $\Delta TG$ and target degree of superheat SH. In this determination, when a difference between temperature difference $\Delta T87$ and the sum of temperature gradient $\Delta TG$ and target degree of superheat SH has an absolute value smaller than a threshold value, it may be determined that temperature difference $\Delta T87$ is equal to the sum of temperature gradient $\Delta TG$ and target degree of superheat SR When temperature difference $\Delta T87$ is not equal to the sum of temperature gradient $\Delta TG$ and target degree of superheat SH (NO in S21A), controller 22 proceeds to S22A. In S22A, controller 22 controls the degree of opening of expansion valve 240 to allow temperature difference $\Delta T87$ to be equal to the sum of temperature gradient $\Delta TG$ and target degree of superheat SH, and then returns to the main routine. When temperature difference $\Delta T87$ is equal to the sum of temperature gradient $\Delta TG$ and target degree of superheat SH (YES in S21A), controller 22 returns to the main routine.

Thus, according to the second embodiment, the ratio of the low boiling temperature refrigerant in the non-azeotropic refrigerant mixture circulating through air conditioner 2 can be calculated without using a pressure sensor. As a result, air conditioner 2 allows a change in the composition ratio of the non-azeotropic refrigerant mixture to be detected while suppressing its manufacturing cost.

According to the second embodiment, the relationship among absolute values $\Delta T12$, T34 and the ratio of the low boiling temperature refrigerant that is applied in the cooling operation can also be applied to calculating the ratio of the low boiling temperature refrigerant of the non-azeotropic mixture circulating through air conditioner 2 in the heating operation.

In the first and second embodiments, an example has been described in which non-azeotropic refrigerant mixture circulates through an air conditioner. The refrigerant circulating through the air conditioner may be a single refrigerant. Even when the refrigerant circulating through the air conditioner is a single refrigerant, air conditioners 1 and 2 can perform air conditioning.

The embodiments disclosed herein are also planned to be combined together as appropriate for implementation. It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST 1, 1A, 2: air conditioner; 10: outdoor unit; 11: indoor unit; 12, 12A, 22: controller; 13: notifier; 14: evaporator; 110: compressor; 120: first heat exchanger; 121: control unit; 122: storage unit; 130: second heat exchanger; 131, 132, 133, 134, 151, 152, 251, 252: temperature sensor; 140, 141A, 142A, 240: expansion valve; 141, 142: capillary; 150: third heat exchanger; 161: first bypass path; 162: second bypass path; 170: four-way valve.

The invention claimed is:

1. An air conditioner configured to circulate non-azeotropic refrigerant mixture including first refrigerant and second refrigerant in a first circulation direction of an order of a compressor, a first heat exchanger, a second heat exchanger, a first expansion valve, and a third heat exchanger, a boiling temperature of the second refrigerant being higher than a boiling temperature of the first refrigerant, the air conditioner comprising:
- a first bypass path branching from a first flow path connecting the second heat exchanger with the first expansion valve, and connected to a second flow path connected to an inlet of the compressor via a first decompressor and the second heat exchanger in this order;
- a second bypass path branching from a third flow path connecting the first heat exchanger with the second heat exchanger, and connected via a second decompressor to a first connecting point between the first decompressor and the second heat exchanger on the first bypass path; and
- a notifier configured to send a user a notification of an occurrence of an event which changes a composition ratio of the non-azeotropic refrigerant mixture when a first ratio defined as the ratio of the first refrigerant in the non-azeotropic refrigerant mixture is different from a specific ratio, the first ratio being determined from the difference between a first temperature and a second temperature and from the difference between a third temperature and a fourth temperature,
- the specific ratio being the first ratio when the non-azeotropic refrigerant mixture is introduced into the air conditioner; and
- a controller configured to control the notifier to send the notification when the first ratio is different from the specific ratio,
- the first temperature being a temperature of the non-azeotropic refrigerant mixture between the first heat exchanger and the second heat exchanger, the second temperature being a temperature of the non-azeotropic refrigerant mixture between the second heat exchanger and the first expansion valve, the third temperature being a temperature of the non-azeotropic refrigerant mixture between the first decompressor and the first connecting point, and the fourth temperature being a temperature of the non-azeotropic refrigerant mixture between the second decompressor and the first connecting point.

2. The air conditioner according to claim 1, further comprising:
- a flow path switching device configured to switch a circulation direction of the non-azeotropic refrigerant mixture to the first circulation direction or a second circulation direction opposite to the first circulation direction; and
- a second expansion valve provided on the third flow path between the first heat exchanger and a second connecting point of the third flow path and the second bypass path, wherein
- when the non-azeotropic refrigerant mixture circulates in the second circulation direction, a degree of opening of the first expansion valve is larger than a first reference degree of opening,
- when the non-azeotropic refrigerant mixture circulates in the first circulation direction, a degree of opening of the second expansion valve is larger than a second reference degree of opening, and
- the notifier sends the user the notification of the occurrence of the event when the first ratio as determined from an absolute value of the difference between the first temperature and the second temperature and an absolute value of the difference between the third temperature and the fourth temperature is different from the specific ratio.

3. The air conditioner according to claim 2, wherein
- when the non-azeotropic refrigerant mixture circulates in the first circulation direction, the degree of opening of the first expansion valve is adjusted to allow a degree of superheat of the non-azeotropic refrigerant mixture from the third heat exchanger to approach a target degree of superheat,
- when the non-azeotropic refrigerant mixture circulates in the second circulation direction, the degree of opening of the second expansion valve is adjusted to allow a degree of superheat of the non-azeotropic refrigerant mixture from the first heat exchanger to approach the target degree of superheat, and
- the target degree of superheat is determined from a temperature gradient of the non-azeotropic refrigerant mixture in a gas-liquid two-phase state.

4. The air conditioner according to claim 1, wherein when refrigerant circulating in the air conditioner is changed to a different non-azeotropic refrigerant mixture including the first refrigerant and being different from the non-azeotropic refrigerant mixture, the specific ratio is changeable by the user to a ratio of the first refrigerant in the different refrigerant mixture when the different refrigerant mixture is introduced into the air conditioner.

5. The air conditioner according to claim 1, wherein
- the notifier sends the user a notification that maintenance is required when the first ratio determined periodically is smaller than a lower limit value, and the first ratio is determined periodically using an index value for a tendency to decrease as calculated from a history of the first ratio recorded in chronological order.

6. The air conditioner according to claim 1, wherein when the compressor has a capacity larger than a reference value, the first decompressor allows the non-azeotropic refrigerant mixture to pass through the first bypass path and the second decompressor is controlled to allow the non-azeotropic refrigerant mixture to pass through the second bypass path, and when the compressor has a capacity smaller than the reference value, the first decompressor is controlled to shut off the first bypass path and the second decompressor is controlled to shut off the second bypass path.

7. The air conditioner according to claim 1, wherein the second heat exchanger includes a first internal flow path through which the non-azeotropic refrigerant mixture from the first heat exchanger flows and a second internal flow path through which the non-azeotropic refrigerant mixture from the first connecting point flows, and the non-azeotropic refrigerant mixture flowing through the first internal flow path and the non-azeotropic refrigerant mixture flowing through the second internal flow path flow in opposite directions.

8. The air conditioner according to claim 1, wherein the first ratio is smaller than a reference ratio at which the difference between the third temperature and the fourth temperature is maximized.

9. The air conditioner according to claim 1, wherein the non-azeotropic refrigerant mixture includes any one of R32, R1123, R1234yf, and R1234ze.

10. The air conditioner according to claim 9, wherein the first refrigerant is R32.

11. The air conditioner according to claim 1, wherein the specific ratio is changeable by the user.

* * * * *